(12) United States Patent
Greenbank et al.

(10) Patent No.: US 12,318,758 B2
(45) Date of Patent: Jun. 3, 2025

(54) TEXTURED SORBENT SHEETS, ASSEMBLIES CONTAINING THEM, AND MOLDS FOR MAKING SAME

(71) Applicant: CALGON CARBON CORPORATION, Moon Township, PA (US)

(72) Inventors: Michael Greenbank, Monaca, PA (US); Jeffrey J. Skalyo, Canonsburg, PA (US); Matthew P. Smales, Monroeville, PA (US); Walter G. Tramposch, Moon Township, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 524 days.

(21) Appl. No.: 16/935,906

(22) Filed: Jul. 22, 2020

(65) Prior Publication Data
US 2021/0023532 A1    Jan. 28, 2021

Related U.S. Application Data

(60) Provisional application No. 62/877,125, filed on Jul. 22, 2019.

(51) Int. Cl.
*B01D 53/02*    (2006.01)
*B01D 53/04*    (2006.01)
(Continued)

(52) U.S. Cl.
CPC ...... *B01J 20/2804* (2013.01); *B01D 53/0415* (2013.01); *B01J 20/28035* (2013.01);
(Continued)

(58) Field of Classification Search
CPC ........ B01D 2253/102; B01D 2253/104; B01D 2253/106; B01D 2253/108;
(Continued)

(56) References Cited

U.S. PATENT DOCUMENTS 2,038,071 A    4/1936    Wilhelm
3,164,452 A    1/1965    Westeren
(Continued)

FOREIGN PATENT DOCUMENTS

CN    1265050 A    8/2000
EP    0433677 A1    6/1991
(Continued)

OTHER PUBLICATIONS

Raposo et al., Mercury Speciation in Fluorescent Lamps by Thermal Release Analysis (2003), Waste Management 23(10):879-886.
(Continued)

*Primary Examiner* — Christopher P Jones
(74) *Attorney, Agent, or Firm* — DLA Piper LLP (US)

(57) ABSTRACT

Textured sorbent material sheets provide for enhanced performance in vapor adsorbing applications over conventional sheets, systems, canisters and other emissions control equipment. The textured sorbent material sheets can be formed as part of a small, lightweight system, canister, or can be integrated into a fuel tank.

19 Claims, 46 Drawing Sheets

(51) Int. Cl.
  *B01J 20/28* (2006.01)
  *B67D 7/04* (2010.01)
(52) U.S. Cl.
  CPC ............ *B67D 7/049* (2013.01); *B67D 7/0492* (2013.01); *B01D 2253/34* (2013.01); *B01D 2257/702* (2013.01); *B01D 2259/4516* (2013.01); *B01D 2259/4566* (2013.01); *B01J 2220/66* (2013.01)
(58) Field of Classification Search
  CPC ........ B01D 2253/11; B01D 2253/1124; B01D 2253/202; B01D 2253/34; B01D 2257/702; B01D 2259/4516; B01D 2259/4566; B01D 53/02; B01D 53/0415; B01J 20/28035; B01J 20/2804; B67D 7/049; B67D 7/0492
  See application file for complete search history.

(56) References Cited

U.S. PATENT DOCUMENTS

| | | | |
|---|---|---|---|
| 3,713,281 A | 1/1973 | Asker et al. | |
| 3,730,158 A | 5/1973 | St. Amand | |
| 3,757,488 A | 9/1973 | Austin et al. | |
| 3,867,111 A | 2/1975 | Knowles | |
| 4,331,639 A | 5/1982 | Hass et al. | |
| 4,338,101 A | 7/1982 | Tuttle | |
| 4,343,629 A | 8/1982 | Dinsmore et al. | |
| 4,418,662 A | 12/1983 | Engler et al. | |
| 4,444,727 A | 4/1984 | Yanagihara et al. | |
| 5,016,628 A | 5/1991 | Lambert | |
| 5,021,071 A | 6/1991 | Reddy | |
| 5,064,805 A | 11/1991 | Otowa | |
| 5,194,414 A * | 3/1993 | Kuma | B01J 35/04 502/80 |
| 5,207,734 A | 5/1993 | Day et al. | |
| 5,310,593 A * | 5/1994 | Tsujimoto | B01J 20/2803 428/184 |
| 5,322,778 A | 6/1994 | Antrim et al. | |
| 5,348,755 A | 9/1994 | Roy | |
| 5,352,274 A | 10/1994 | Blakley | |
| 5,500,038 A | 3/1996 | Dauber et al. | |
| 5,598,721 A | 2/1997 | Rockenfeller et al. | |
| 5,658,369 A | 8/1997 | Kusay | |
| 5,713,881 A | 2/1998 | Rezai et al. | |
| 5,726,118 A | 3/1998 | Ivey et al. | |
| 5,754,002 A | 5/1998 | Haitko et al. | |
| 5,820,644 A * | 10/1998 | Mori | B32B 5/32 55/528 |
| 5,821,682 A | 10/1998 | Foust et al. | |
| 5,861,050 A | 1/1999 | Pittel et al. | |
| 5,871,568 A | 2/1999 | Gibson | |
| 5,897,779 A | 4/1999 | Wisted et al. | |
| 5,952,420 A | 9/1999 | Senkus et al. | |
| 5,964,221 A | 10/1999 | McKenna | |
| 6,047,687 A | 4/2000 | Ishikawa et al. | |
| 6,146,451 A * | 11/2000 | Sakata | B01J 20/16 96/135 |
| 6,176,897 B1 | 1/2001 | Keefer | |
| 6,186,939 B1 | 2/2001 | Forrester | |
| 6,261,345 B1 | 7/2001 | Miyano et al. | |
| 6,280,824 B1 | 8/2001 | Insley et al. | |
| 6,342,129 B1 | 1/2002 | Vaughn et al. | |
| 6,406,523 B1 | 6/2002 | Connor et al. | |
| 6,472,343 B1 | 10/2002 | McCrae et al. | |
| 6,540,815 B1 | 4/2003 | Hiltzik et al. | |
| 6,599,856 B1 | 7/2003 | Uchino et al. | |
| 6,652,627 B1 | 11/2003 | Tonkovich et al. | |
| 6,699,393 B2 | 3/2004 | Baker et al. | |
| 6,706,194 B2 | 3/2004 | Baker et al. | |
| 6,848,374 B2 | 2/2005 | Srinivasachar et al. | |
| RE38,844 E | 10/2005 | Hiltzik et al. | |
| 7,077,891 B2 | 7/2006 | Jaffe et al. | |
| 7,132,007 B1 | 11/2006 | Von Blücher et al. | |
| 7,222,612 B2 | 5/2007 | Hagler et al. | |
| 7,278,406 B2 | 10/2007 | Hagler | |
| 7,326,278 B2 | 2/2008 | Butters et al. | |
| 7,531,029 B2 | 5/2009 | Hoke et al. | |
| 7,547,350 B2 | 6/2009 | Callahan et al. | |
| 7,578,285 B2 | 8/2009 | Buelow et al. | |
| 7,666,507 B2 | 2/2010 | Ishikawa et al. | |
| 7,704,305 B2 | 4/2010 | Nishida | |
| 7,708,817 B2 | 5/2010 | Hurley et al. | |
| 7,744,677 B2 | 6/2010 | Barclay et al. | |
| 7,780,765 B2 | 8/2010 | Srinivasachar et al. | |
| 7,858,061 B2 | 12/2010 | Varma et al. | |
| 7,862,725 B2 | 1/2011 | Mazyck et al. | |
| 7,879,136 B2 | 2/2011 | Mazyck | |
| 8,034,163 B1 | 10/2011 | Durham et al. | |
| 8,042,524 B2 | 10/2011 | Elum et al. | |
| 8,057,576 B1 | 11/2011 | Pollack | |
| 8,069,797 B2 | 12/2011 | Srinivasachar et al. | |
| 8,080,088 B1 | 12/2011 | Srinivasachar | |
| 8,168,147 B2 | 5/2012 | Olson et al. | |
| 8,262,785 B2 | 9/2012 | Barron et al. | |
| 8,263,524 B1 | 9/2012 | Skandan et al. | |
| 8,372,477 B2 | 2/2013 | Buelow et al. | |
| 8,632,334 B2 | 1/2014 | Knueppel et al. | |
| 8,852,322 B2 | 10/2014 | Gupta et al. | |
| 8,864,877 B2 | 10/2014 | Nishita et al. | |
| 8,888,901 B2 | 11/2014 | Kimoto | |
| 9,138,684 B2 | 9/2015 | Li et al. | |
| 9,732,649 B2 | 8/2017 | Hiltzik et al. | |
| 10,807,034 B2 * | 10/2020 | Greenbank | B01J 20/28035 |
| 12,076,687 B2 | 9/2024 | Greenbank et al. | |
| 2002/0124732 A1 | 9/2002 | Hara et al. | |
| 2002/0124733 A1 | 9/2002 | Iriyama et al. | |
| 2002/0170436 A1 | 11/2002 | Keefer et al. | |
| 2003/0037672 A1 | 2/2003 | Sircar | |
| 2003/0116021 A1 | 6/2003 | Oda et al. | |
| 2003/0188663 A1 | 10/2003 | Barthel et al. | |
| 2004/0116014 A1 | 6/2004 | Soerens et al. | |
| 2004/0118287 A1* | 6/2004 | Jaffe | B01D 53/0423 96/121 |
| 2004/0118387 A1 | 6/2004 | Lawrence | |
| 2004/0197612 A1 | 10/2004 | Keefer et al. | |
| 2004/0262217 A1* | 12/2004 | Mori | B01D 39/1692 210/493.1 |
| 2005/0081717 A1 | 4/2005 | Meiller et al. | |
| 2005/0167367 A1 | 8/2005 | Baker | |
| 2005/0172805 A1* | 8/2005 | Motono | B01D 53/261 96/125 |
| 2005/0211099 A1 | 9/2005 | Doughty et al. | |
| 2005/0241479 A1 | 11/2005 | Lebowitz et al. | |
| 2005/0279210 A1 | 12/2005 | Hirata | |
| 2006/0032372 A1 | 2/2006 | Dauber et al. | |
| 2006/0042467 A1 | 3/2006 | Maru | |
| 2006/0054142 A1 | 3/2006 | Burke et al. | |
| 2006/0142154 A1 | 6/2006 | Wolff | |
| 2006/0205830 A1 | 9/2006 | Lebowitz et al. | |
| 2006/0283996 A1 | 12/2006 | Jensen | |
| 2007/0034193 A1 | 2/2007 | King | |
| 2007/0101865 A1 | 5/2007 | Kim et al. | |
| 2007/0113740 A1 | 5/2007 | Oda | |
| 2007/0169758 A1 | 7/2007 | Mills | |
| 2007/0272080 A1 | 11/2007 | Allen et al. | |
| 2008/0121142 A1 | 5/2008 | Comrie et al. | |
| 2008/0141637 A1 | 6/2008 | Hirata et al. | |
| 2008/0308075 A1 | 12/2008 | Allen et al. | |
| 2009/0025553 A1 | 1/2009 | Keefer et al. | |
| 2009/0172998 A1 | 7/2009 | Harris et al. | |
| 2009/0223370 A1 | 9/2009 | Kosugi et al. | |
| 2010/0178624 A1 | 7/2010 | Srinivasachar | |
| 2010/0300288 A1* | 12/2010 | Boulet | B01J 20/28035 96/132 |
| 2010/0316538 A1 | 12/2010 | Buelow et al. | |
| 2011/0030592 A1 | 2/2011 | Baldrey et al. | |
| 2011/0072974 A1 | 3/2011 | Patel | |
| 2011/0100223 A1 | 5/2011 | Tarrant et al. | |
| 2011/0214572 A1 | 9/2011 | Hasegawa et al. | |
| 2012/0048110 A1 | 3/2012 | Dawes et al. | |
| 2012/0079926 A1 | 4/2012 | Long et al. | |
| 2012/0100054 A1 | 4/2012 | Durham et al. | |

(56) References Cited

U.S. PATENT DOCUMENTS

| | | |
|---|---|---|
| 2013/0078169 A1 | 3/2013 | LaFlesh et al. |
| 2013/0109562 A1 | 5/2013 | Wong et al. |
| 2013/0186375 A1* | 7/2013 | Hasegawa ............. F02M 25/06 |
| | | 123/519 |
| 2013/0263741 A1 | 10/2013 | Mani et al. |
| 2013/0269532 A1 | 10/2013 | Kimoto |
| 2013/0276634 A1* | 10/2013 | McKenna .......... B01J 20/28042 |
| | | 96/153 |
| 2013/0330257 A1 | 12/2013 | Tramposch |
| 2014/0117054 A1 | 5/2014 | Ryan et al. |
| 2014/0165542 A1 | 6/2014 | Loftin et al. |
| 2014/0216261 A1* | 8/2014 | Fleming, Jr. ........... A23B 7/148 |
| | | 96/124 |
| 2014/0295134 A1 | 10/2014 | Wood et al. |
| 2014/0352542 A1 | 12/2014 | Mani |
| 2014/0374655 A1 | 12/2014 | Mimna |
| 2015/0050202 A1 | 2/2015 | Filippelli et al. |
| 2016/0030914 A1 | 2/2016 | Boenkendorf et al. |
| 2016/0031318 A1 | 2/2016 | Shimokawa |
| 2016/0166972 A1 | 6/2016 | Owens et al. |
| 2016/0271555 A1 | 9/2016 | Hiltzik et al. |
| 2018/0030871 A1 | 2/2018 | Hiltzik et al. |
| 2018/0214816 A1* | 8/2018 | Greenbank ............ B01D 53/02 |
| 2018/0229217 A1 | 8/2018 | Mazzoccoli et al. |
| 2018/0363594 A1 | 12/2018 | Byrne et al. |
| 2019/0134558 A1* | 5/2019 | Billiet .................. B01D 53/261 |
| 2019/0247831 A1 | 8/2019 | Tramposch et al. |
| 2019/0262573 A1* | 8/2019 | McKenna .......... B01J 20/28033 |
| 2020/0038798 A1 | 2/2020 | Greenbank et al. |
| 2020/0039809 A1 | 2/2020 | Greenbank et al. |
| 2020/0040851 A1 | 2/2020 | Greenbank et al. |
| 2021/0023532 A1 | 1/2021 | Greenbank et al. |
| 2021/0039037 A1 | 2/2021 | Greenbank et al. |
| 2021/0172402 A1 | 6/2021 | Byrne et al. |
| 2021/0354075 A1 | 11/2021 | Smales et al. |

FOREIGN PATENT DOCUMENTS

| | | |
|---|---|---|
| EP | 1413348 A1 | 4/2004 |
| EP | 1377520 B1 | 3/2014 |
| EP | 2125162 B1 | 7/2014 |
| FR | 3035196 A1 | 10/2016 |
| FR | 3076743 A1 | 7/2019 |
| GB | 1336241 A | 11/1973 |
| JP | S55-107056 A | 8/1980 |
| JP | H04265461 A | 9/1992 |
| JP | H07269421 A | 10/1995 |
| JP | 2001-505813 A | 5/2001 |
| JP | 2004-154652 A | 6/2004 |
| JP | 2006-068588 A | 3/2006 |
| JP | 2008023365 A | 2/2008 |
| JP | 2013188715 A | 9/2013 |
| JP | 2016500784 A | 1/2016 |
| JP | 2018505071 A | 2/2018 |
| KR | 890000460 B1 | 3/1989 |
| KR | 20070083883 A | 8/2007 |
| KR | 10-1118048 B1 | 2/2012 |
| KR | 2016-0107150 A | 9/2016 |
| WO | 9851397 A1 | 11/1998 |
| WO | 2004089501 A2 | 10/2004 |
| WO | 2010042321 A1 | 4/2010 |
| WO | 2011038415 A2 | 3/2011 |
| WO | 2011127323 A2 | 10/2011 |
| WO | 2013063490 A1 | 5/2013 |
| WO | 2013083992 A1 | 6/2013 |
| WO | 2014082076 A1 | 5/2014 |
| WO | 2014088630 A1 | 6/2014 |
| WO | 2014205200 A1 | 12/2014 |
| WO | 2015/053815 A1 | 4/2015 |
| WO | 2018144588 A1 | 8/2018 |
| WO | 2020028703 A2 | 2/2020 |
| WO | 2020028839 A1 | 2/2020 |
| WO | 2020028845 A1 | 2/2020 |

OTHER PUBLICATIONS

Korea Auto News, "22. Introduction to ORVR (Onboard Refueling Vapor Recovery System) System", Automotive Industry Specialized Portal, Jan. 2018, retrieved from URL:, https://www.korea-autonews.com/entry/ORVROnboard-Refueling (5 total pages).

Garn et al. "Development and evaluation of a silver mordenite composite sorbent for the partitioning of xenon from krypton in gas compositions" Dec. 22, 2015, Journal of Nuclear Science and Technology, 53(10):1484-1488.

Guo et al. "Preparation and methane adsorption performance of petroleum coke-based activated carbon" Sep. 15, 2013, Chemical Industry and Engineering Progress, 32(z1):8 pages (with English Abstract).

* cited by examiner

Config. A (Inward Wind)
Notebook# 3460-50-8
DOE#2 Sample A-4
IMG_0102

Config. B (Outward Wind)
Notebook# 3460-50-14
DOE#2 Sample B-5
IMG_0099

Config. C (Double Sided)
Notebook# 3460-50-7
DOE#2 Sample C-2
IMG_0096

TEXTURED SORBENT SHEETS, ASSEMBLIES CONTAINING THEM, AND MOLDS FOR MAKING SAME

CROSS REFERENCE TO RELATED APPLICATIONS

This application claims priority to U.S. Provisional Application Ser. No. 62/877,125 filed on Jul. 22, 2019, the content of which is hereby incorporated by reference in its entirety.

BACKGROUND

Activated carbon sheets have very low permeability so are used in flow across and not flow through arrangements. These sheets can be stacked or spiral wound and naturally generate voids between the sheets for gas or liquid flow. Using smooth flat sheets, these stacks and spirals are physically stable in a tightly wound configuration with a void percentage as low as 10%. To decrease pressure drop, a higher void percentage can be used but in such a case, the sheet stacks or sheet spirals can shift and slip resulting in uneven sheet spacing causing higher pressure drop and uneven flow distribution.

Corrugation refers to drawing or bending a material into folds. Corrugated sheets, combinations of corrugated and flat sheet, or sheets with dimple patterns pressed into them also were not stable due to the relaxation of the corrugation or pressed patterns back to a flatter sheet. In all these cases the thickness of the sheet is the same as the original flat sheet but with a corrugation wave or dimple pattern impressed on the flat sheet. These technologies were borrowed from the paper industry. The result was again physically unstable stacked or spiraled sheet configurations with void fractions over 10%. The inherent problem was that the corrugated or dimpled activated carbon sheet could relax back to the original flat sheet, in the case of corrugation, with reduced or eliminated corrugation, and in the case of dimpling with the same thickness as the original flat sheet.

Bi-planar spacers and/or porous/permeable separators can also be used as part of the wound or layered adsorber to overcome these issues but they add volume to the adsorber without any adsorptive advantage.

These concepts, and others, were introduced in Applicant's U.S. patent application Ser. No. 15/885,317 entitled SORBENT DEVICES, filed on Jan. 31, 2018, the entirety of which is hereby incorporated by reference. This disclosure improves upon those concepts by providing, among other things, thicker, textured carbon sheets, molds for making them, and assemblies containing rolled or stacked configurations. This application discloses various embodiments, but is not limited to the embodiments described, as will be apparent to those of ordinary skill in the art upon reading this disclosure.

SUMMARY

This summary is provided to comply with 37 C.F.R. § 1.73, requiring a summary of the invention briefly indicating the nature and substance of the invention. It is submitted with the understanding that it will not be used to interpret or limit the scope or meaning of the claims.

In one embodiment, there is a textured sorbent material sheet, comprising a textured sorbent material sheet comprising a sorbent material and a binder, defined, the textured sorbent sheet defining an upper surface and a lower surface wherein at least one of the upper surface and the lower surface comprises a texture defined by a series of hills and valleys.

In another embodiment, the textured sorbent material has a thickness measured at a valley selected from less than about 1 mm, about 0.1 mm to about 1.0 mm, about 0.2 mm to about 0.90 mm, about 0.5 to about 0.95 mm, about 0.5 to about 0.90 mm or any individual thickness or range encompassed by these example ranges.

In another embodiment, the textured sorbent material sheets may have a thickness measured at a hill or peak is selected from about 1.0 to about 1.5 mm, about 1.4 mm, about 1.3 mm, about 1.2 mm or any individual thickness or range encompassed by any two of these values.

In another embodiment, the distance from tip of a hill to the bottom of a valley is selected from about 1.0 mm to about 0.1 mm, about 0.5 mm to about 0.1 mm, about 0.4 mm, about 0.3 mm, about 0.2 mm, or any individual distance or range encompassed by any two of these values.

In another embodiment, each of the upper surface and the lower surface comprises a texture defined by a series of hills and valleys.

In another embodiment, the texture of the upper surface is identical to that of the lower surface.

In another embodiment, the texture of the upper surface is different from that of the lower surface.

In one embodiment, there is textured sorbent material sheet product, comprising at least two textured sorbent material sheets in accordance with a the first embodiment, and wherein each textured sorbent material sheet is stacked and arranged such that adjacent upper and lower surfaces of the separate sheets are substantially parallel and are aligned to allow fluid flow at least between the adjacent upper and lower surfaces.

In another embodiment, at least one of the textured sorbent material sheets are configured as being flat, wound in a spiral cylinder, wound in an elliptical form, wound in an elongate rectangular bar, folded, laminated in an "S" shape, formed as concentric cylinders, formed as concentric ellipses, formed as a concentric rectangular bar, or as combinations of these forms.

In another embodiment, the hills and valleys portions are present on adjacent sheets and are nested.

In another embodiment, the raised and/or depressed portions are present on adjacent sheets and are not nested.

In one embodiment, there is a rolled textured sorbent material sheet product, comprising a textured sorbent material sheet according to the first embodiment, wherein the textured sorbent material sheet is spiral wound to form adjacent sheet layers which allow fluid flow around and between adjacent sheet layers.

In another embodiment, the rolled textured sorbent material sheet product has a generally cylindrical shape having a length that is greater than its diameter.

In another embodiment, there is vapor adsorbing canister, comprising the textured sorbent material sheet product of a previous embodiment, and a housing at least partially encapsulating the textured sorbent material sheet product.

In another embodiment, there is a vapor adsorbing canister of a previous embodiment, wherein the housing is flexible.

In one embodiment, there is a rolled textured sorbent material sheet product, and a housing at least partially encapsulating the rolled textured sorbent material.

In one embodiment, there is a tank with integral vapor adsorption, comprising: a tank structure, and at least one textured sorbent material sheet in accordance with the first embodiment, and at least one fastening device which fastens the textured sorbent material sheet to a surface of the tank that is not regularly immersed in the volatile liquids contained within the tank.

In another embodiment, the fastening device is an adhesive layer which is formed between one surface of the textured sorbent material sheet and a wall of the tank.

In another embodiment, there is an onboard refueling vapor recovery apparatus comprising the textured sorbent material sheet of the previous embodiments.

In another embodiment, there is an apparatus comprising the rolled textured sorbent material sheet product of the previous embodiments.

In one embodiment, there is an onboard refueling vapor recovery apparatus comprising the vapor adsorbing canister of the previous embodiments.

DETAILED DESCRIPTION

Figure 1:
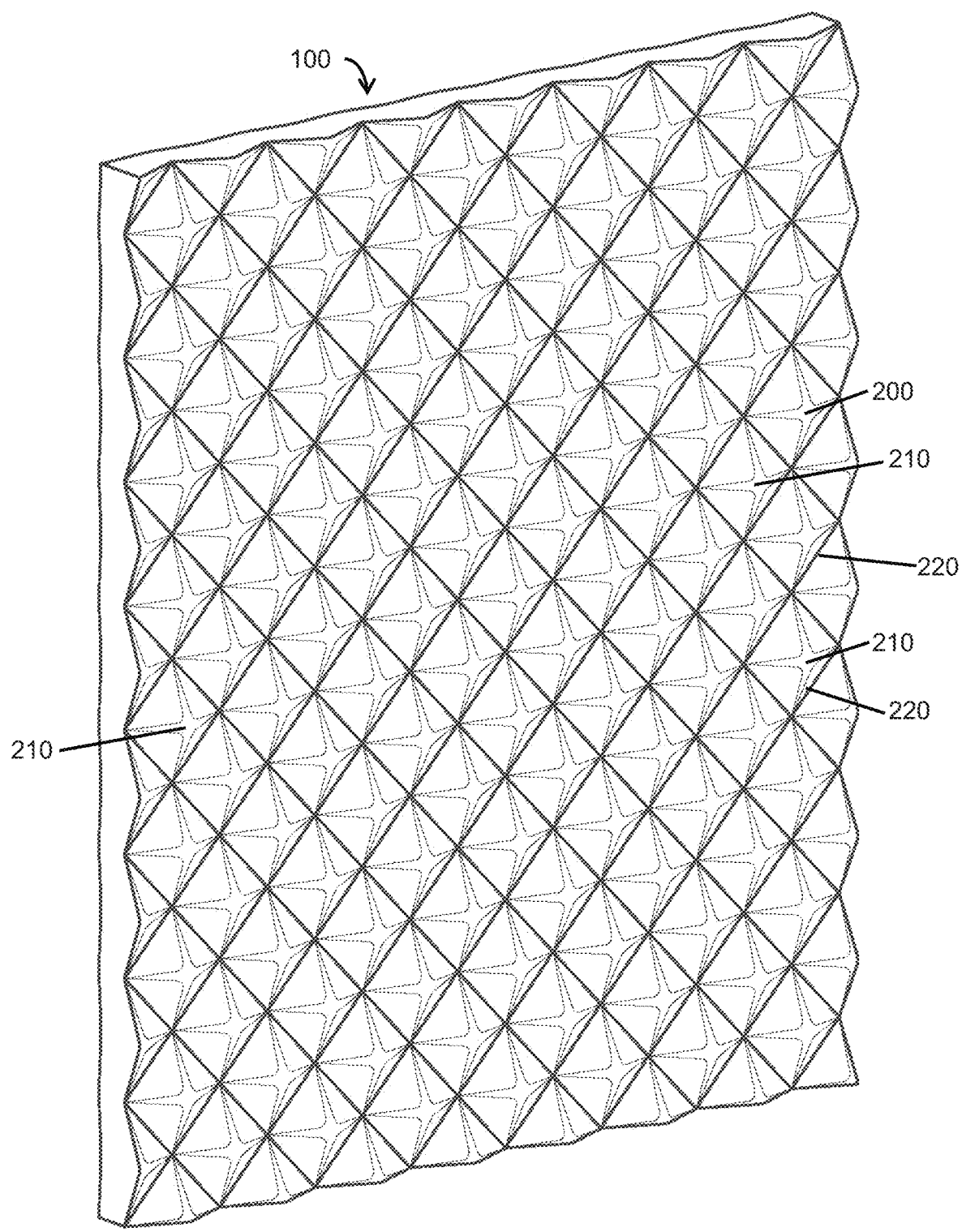
FIG. 1 depicts a profile view of the top of the Diamond mold.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

As used herein, the term "sorbent material" is meant to encompass all known materials from any source that are capable of adsorbing and/or absorbing liquids and/or gases. For example, sorbent materials include, but are not limited to, activated carbon, natural and synthetic zeolite, silica, silica gel, alumina, zirconia, and diatomaceous earths.

As used herein, descriptions and claims of multiple sorbent material sheets mean that there are multiple, separated sheets, with sides and/or surfaces in proximity to each other. Alternatively, descriptions and claims of multiple sorbent material sheets mean that there is only a single sheet, but that it has been wound or folded over on itself to yield a stacked, wound, or otherwise constructed mass of sheets with sides and/or surfaces in proximity to each other. The term also envisions that multiple sheets are stacked together and then wound or otherwise folded over, forming alternating layers in a single mass.

Embodiments of the invention are directed to devices containing one or more textured sheets of sorbent material, and molds and methods for making textured sorbent material sheets and devices containing these sheets. In various embodiments, the textured sorbent material sheets may be composed of a sorbent material and a binder and have a thickness sufficient to allow portions of the sheet to be compressed creating hills and valleys of desired cross-sectional size and shape. The devices of various embodiments may include a housing and one or more of textured sorbent material sheets.

An extra thick, e.g. greater than 1.25 mm, activated carbon sheet was pressed between a flat surface and the textured surface of a mold. The overall average thickness of the sheet was reduced and texture was added to only one side of the sheet. The sheet thickness would vary with the hills and valleys of the texture pattern. This single sheet was stable with time and temperature because it has no means of relaxing to the original thick sheet. This approach was possible with the thicker activated carbon sheet material due to its malleability.

By way of contrast, corrugation or dimple patterns relaxed to the close to the original flat sheet configuration with time and temperature. One solution was to add spacers between the sheets to provide stable voids and spiral construction. Spacers, however, add cost and volume with no adsorptive performance. The best solution was to glue small strips of activated carbon sheet to the flat sheet to provide a spacer that also adsorbed. This performed well in adsorption and pressure drop testing but was manpower intensive, introduced a glue to the system, and was not practical even for prototype production. These systems differ from corrugated sheets in that unlike corrugation, the sheet was not drawn, bent, or folded, but rather sheet material was built up by the addition of layers in select locations and patterns. Much of this disclosure relates to emulating the buildup of material with embossing or compression techniques whereby desired textures of hill and valleys are formed in a relatively thick activated carbon sheet. This is distinguished from dimple patterns where a relatively thin sheet is dimpled where the dimple results in a depression on one side of the sheet and a corresponding raised portion on the opposite side of the sheet. Over time, these dimples relax, leaving a substantially flat sheet. The methods and textures described herein do not exhibit that same behavior.

The single sheet approach with one flat side and the other with the texture pattern made physically robust spirals, practical for manufacture, and stable with time and temperature since it had no means of relaxing to the original thick sheet. When rolled into a spiral or assembled into a stack of flat sheets, the texture fits against the flat side to generate evenly spaced and sized channels for fluid flow. The uniformity in size and placement of these channels means lowest possible pressure drop for a given void fraction and best flow distribution which improves adsorptive performance.

Sheets may be textured on one or both sides. In some embodiments, the pattern and resultant channels are parallel or co-linear with the flow of the fluid through the sheets to achieve the low pressure drop. The texture may also itself form channels and flow that are not straight, such as angled, serpentine, irregular, or more complicated.

The Molds or Wraps

Central to this disclosure is the creation of textured sorbent sheets by way of compressing selected portions of a relatively thick carbon sheet. As alluded to above, this can be accomplished by passing the carbon sheet through one or more rollers having a negative mold therein. Steel or other rollers having grooved patterns therein are one option. It has been found that a variety of molds can be formed in rubber or other suitable material in the form of a wrap that can be affixed to the circumference of a roller to achieve the desired texture and pattern. The wrap needs to be of material of sufficient hardness to imprint and compress the sorbent sheet, but also flexible enough to wrap around the roller. The wrap will contain a series of hills and valleys corresponding, but opposite, to the desired pattern in the textured sorbent sheet. A variety of these molds are shown in the various figures, as well as their resultant textured sheets. A steel or metal roll can also be patterned. Molds may also be used as flat molds or a continuous feed belts through the main rollers, particularly rubber molds. The figures are representative only and are not meant to be limiting. A variety of textures and patterns can be used depending on the desired properties. FIGS. 1-19 depict a variety of mold shapes. The shapes, textures, thickness, dimensions and other features depicted are exemplary. Actual molds are not limited to these designs. Through choice of shapes, dimensions, location of hills and valleys, various properties of the resultant textured sorbent sheet can be controlled.

Figures 2, 3:
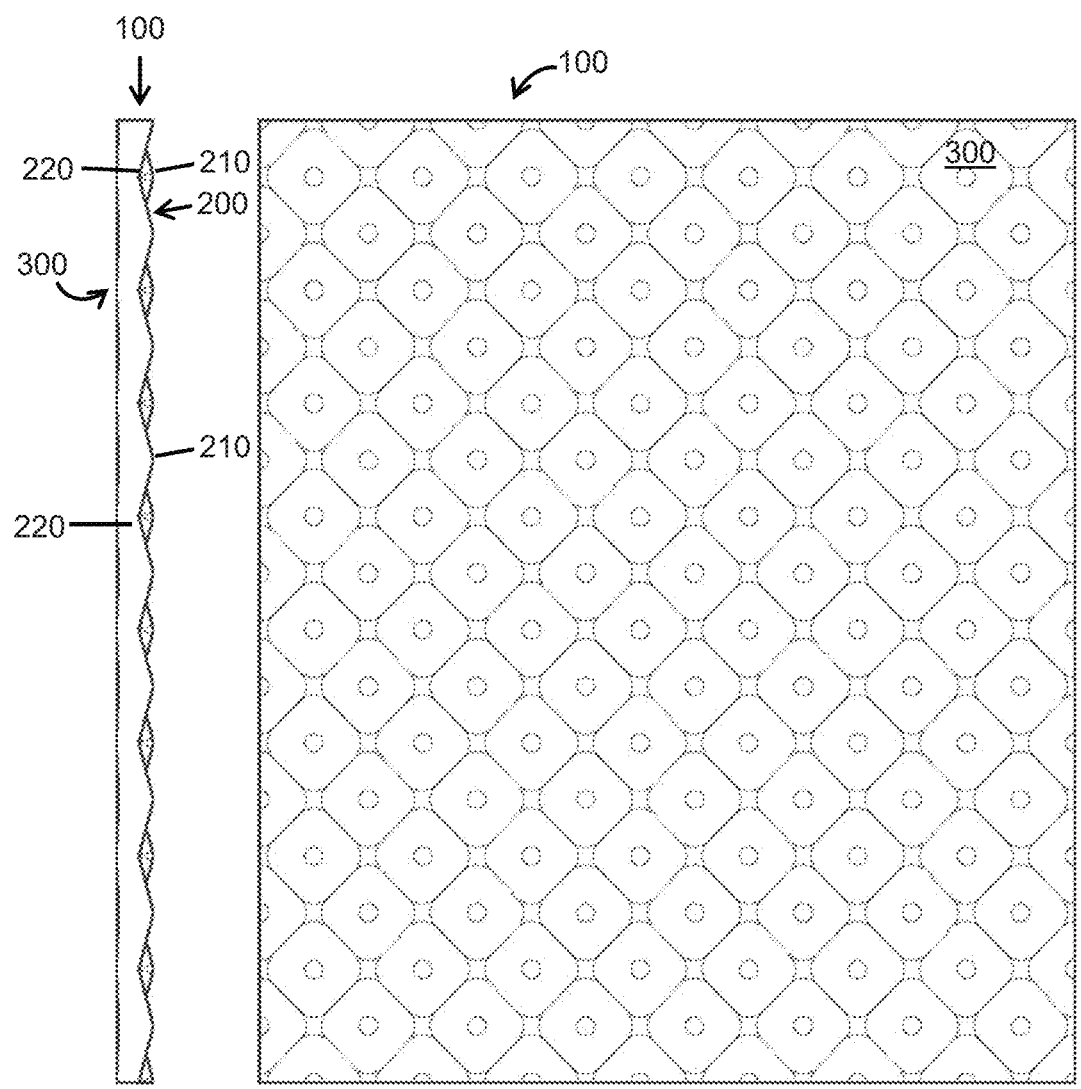
FIG. 2 depicts a side view of the Diamond mold.
FIG. 3 depicts a bottom view of the Diamond mold.
Figure 4:
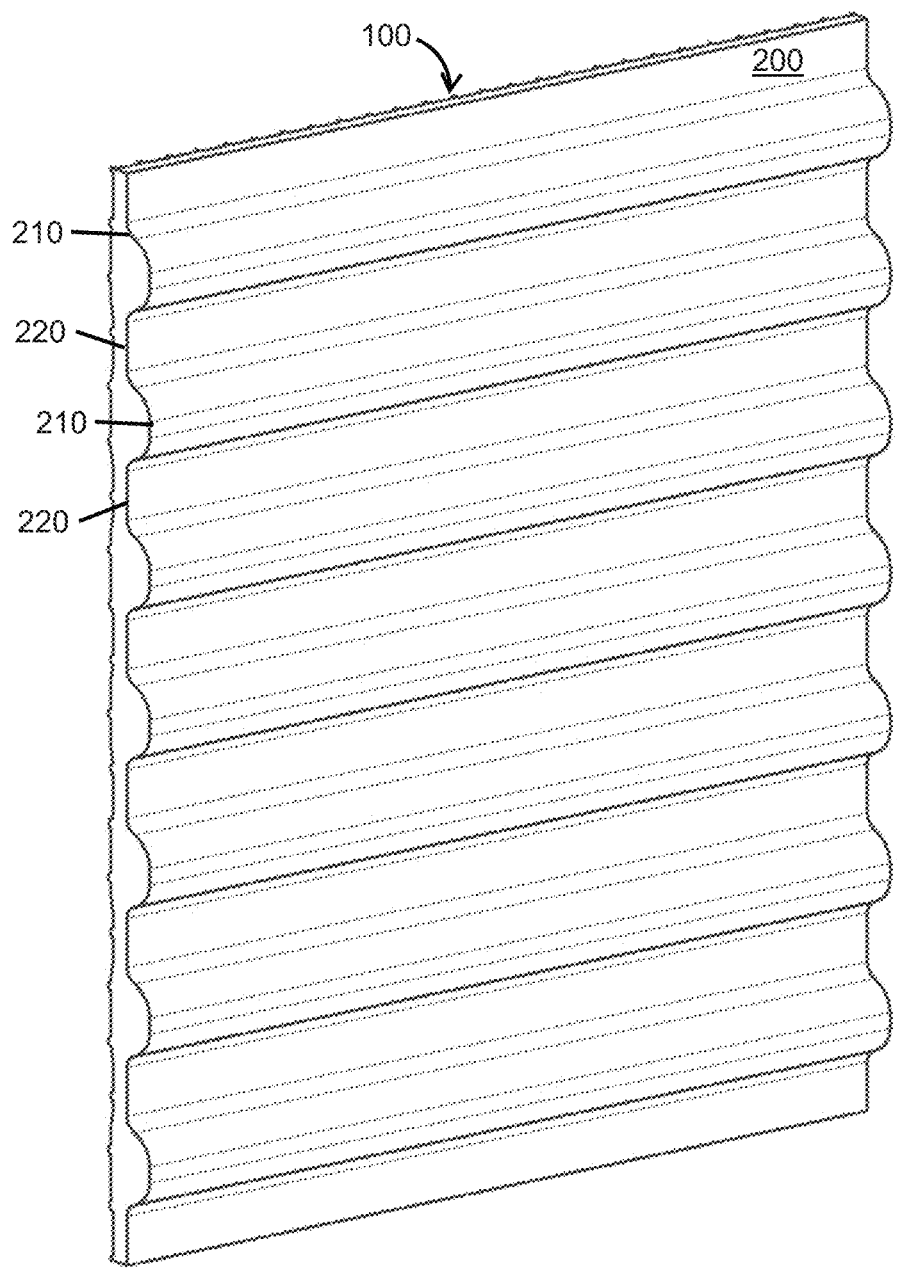
FIG. 4 depicts a profile view of the top of the Round Rib Style #1 mold.
Figures 5, 6:
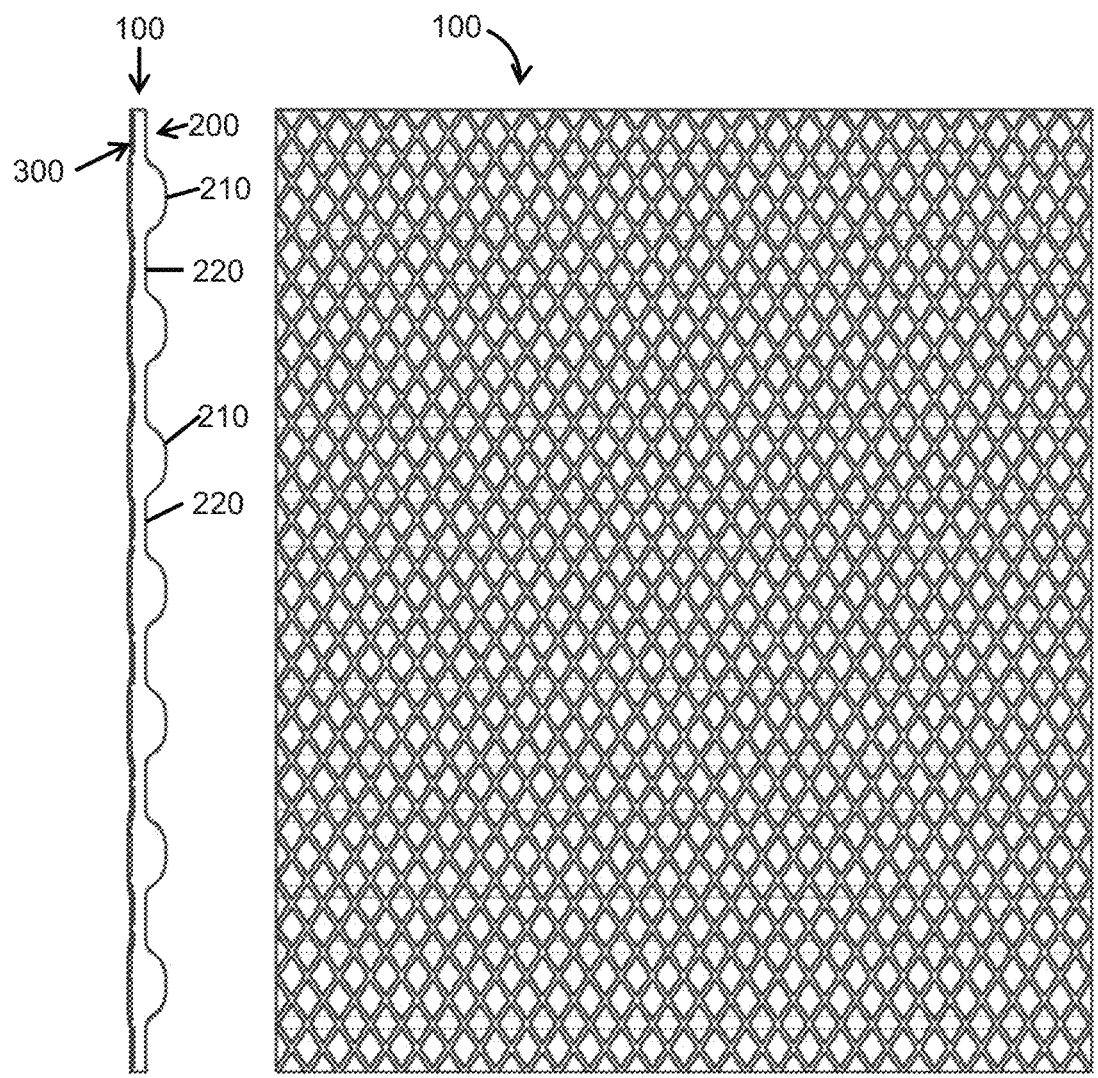
FIG. 5 depicts a side view of the Round Rib Style #1 mold.
FIG. 6 depicts a bottom view of the Round Rib Style #1 mold.
Figure 7:
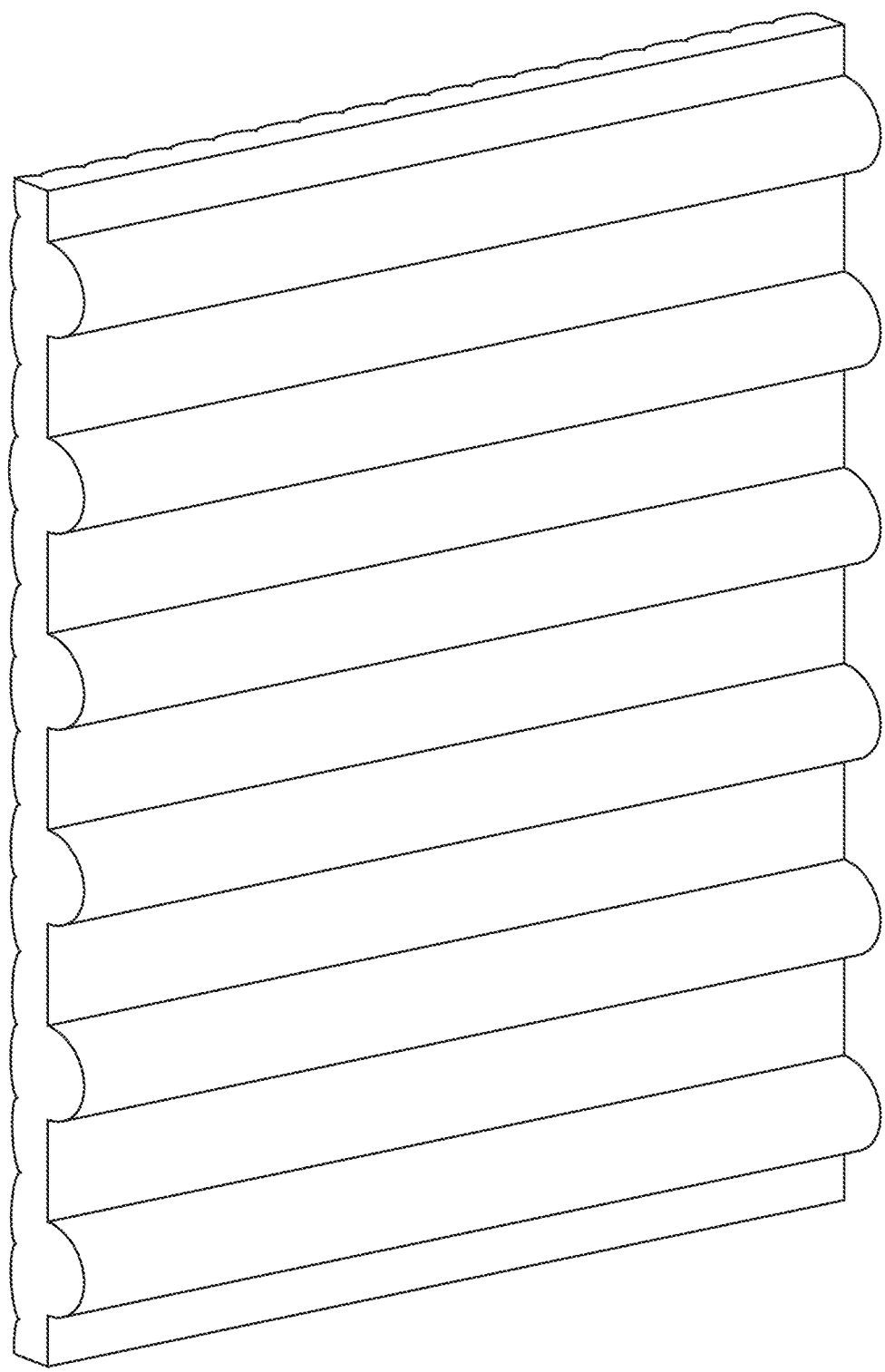
FIG. 7 depicts a profile view of the top of the Round Rib Style #2 mold.
Figure 8:
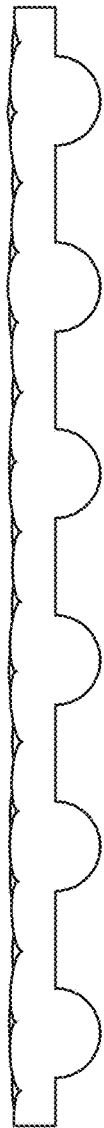
FIG. 8 depicts a side view of the Round Rib Style #2 mold.
Figure 9:
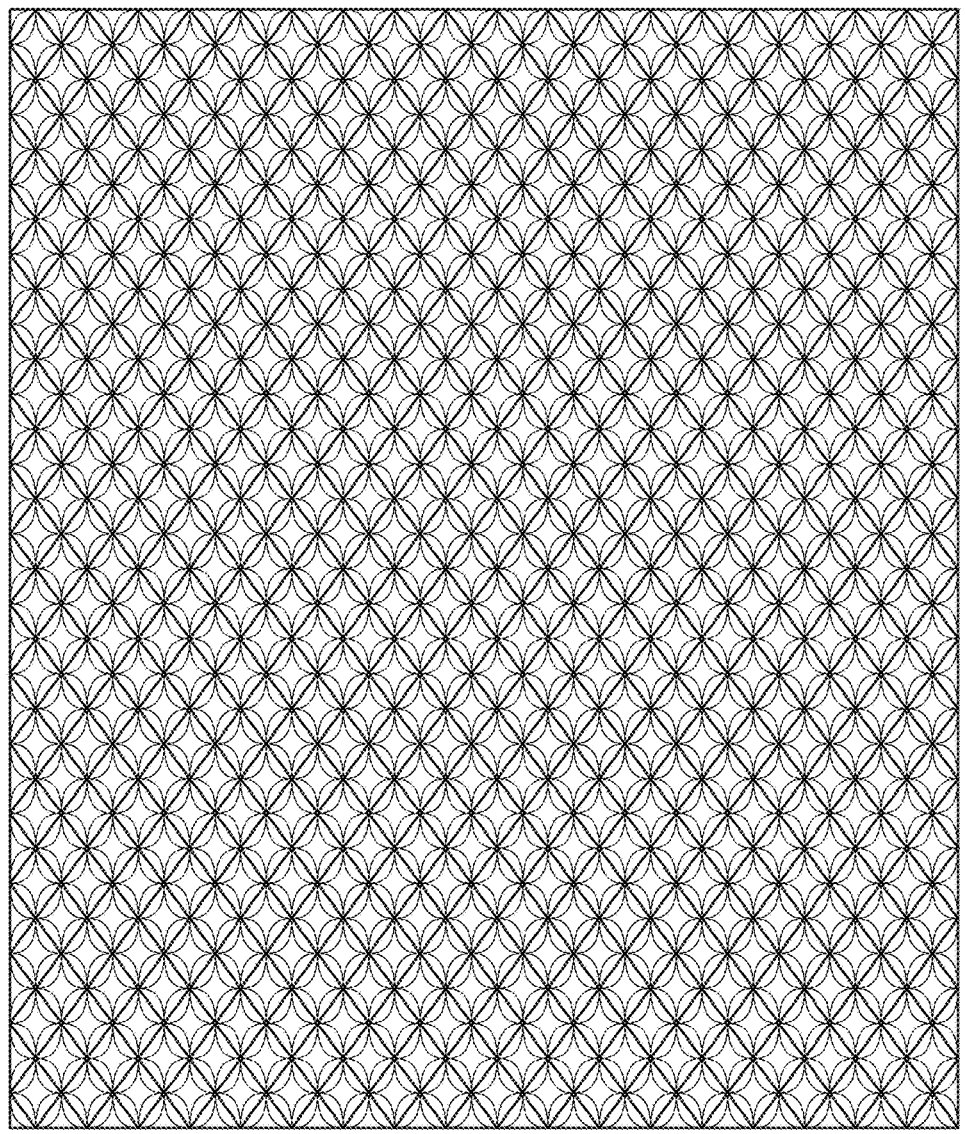
FIG. 9 depicts a bottom view of the Round Rib Style #2 mold.
Figure 10:
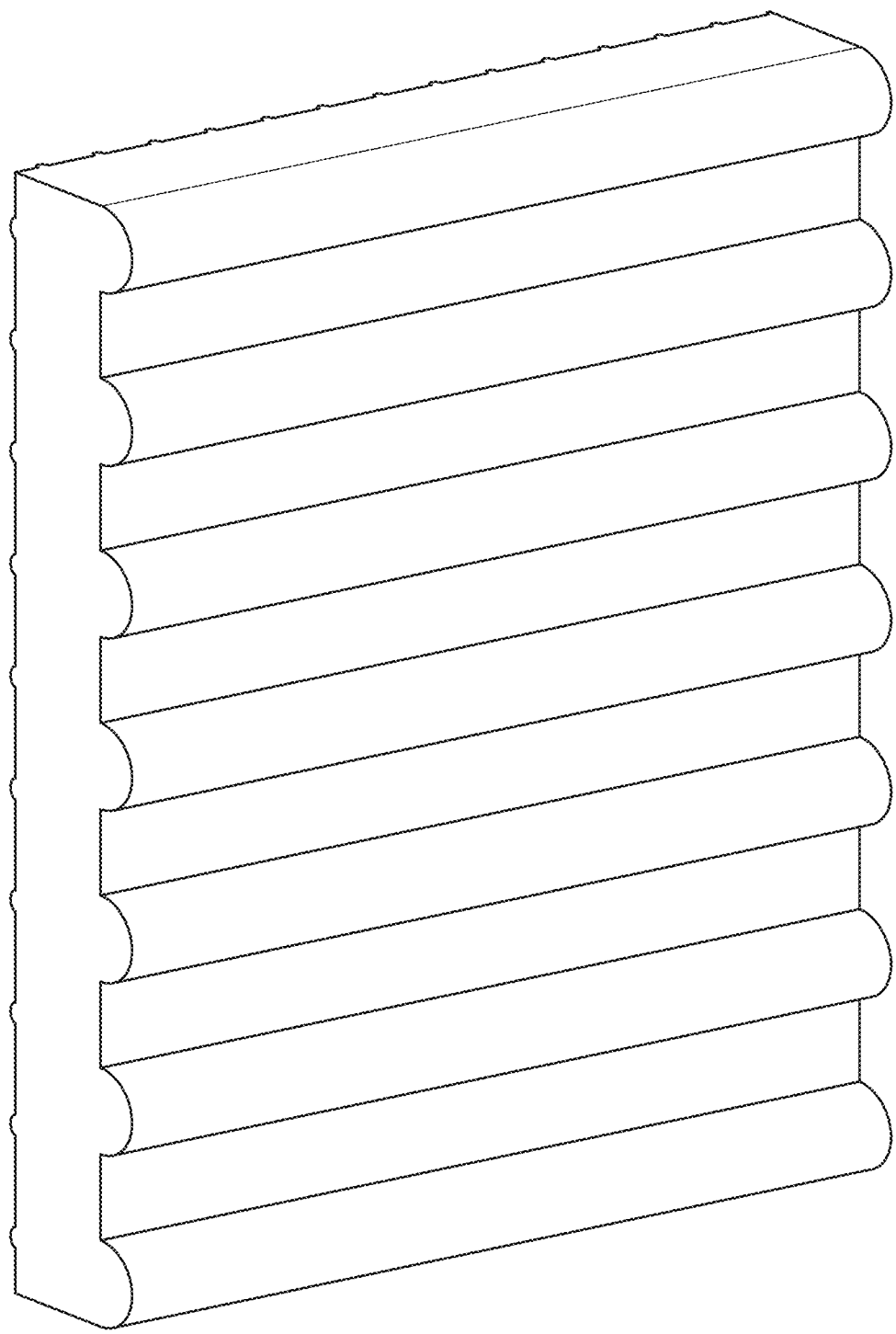
FIG. 10 depicts a profile view of the top of the Round Rib Style #3 mold.
Figure 11:
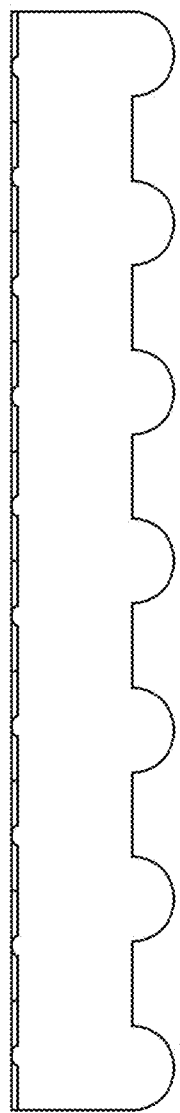
FIG. 11 depicts a side view of the Round Rib Style #3 mold.
Figure 12:
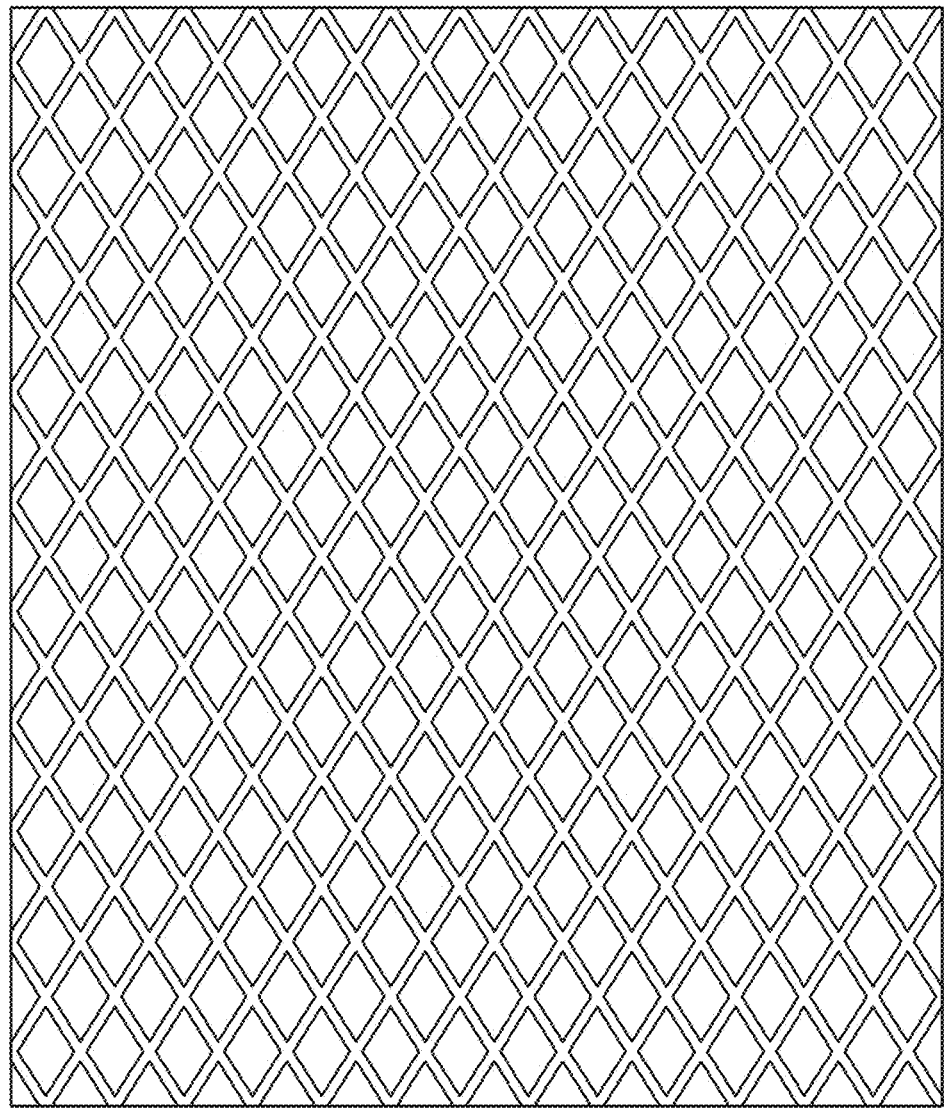
FIG. 12 depicts a bottom view of the Round Rib Style #3 mold.
Figure 13:
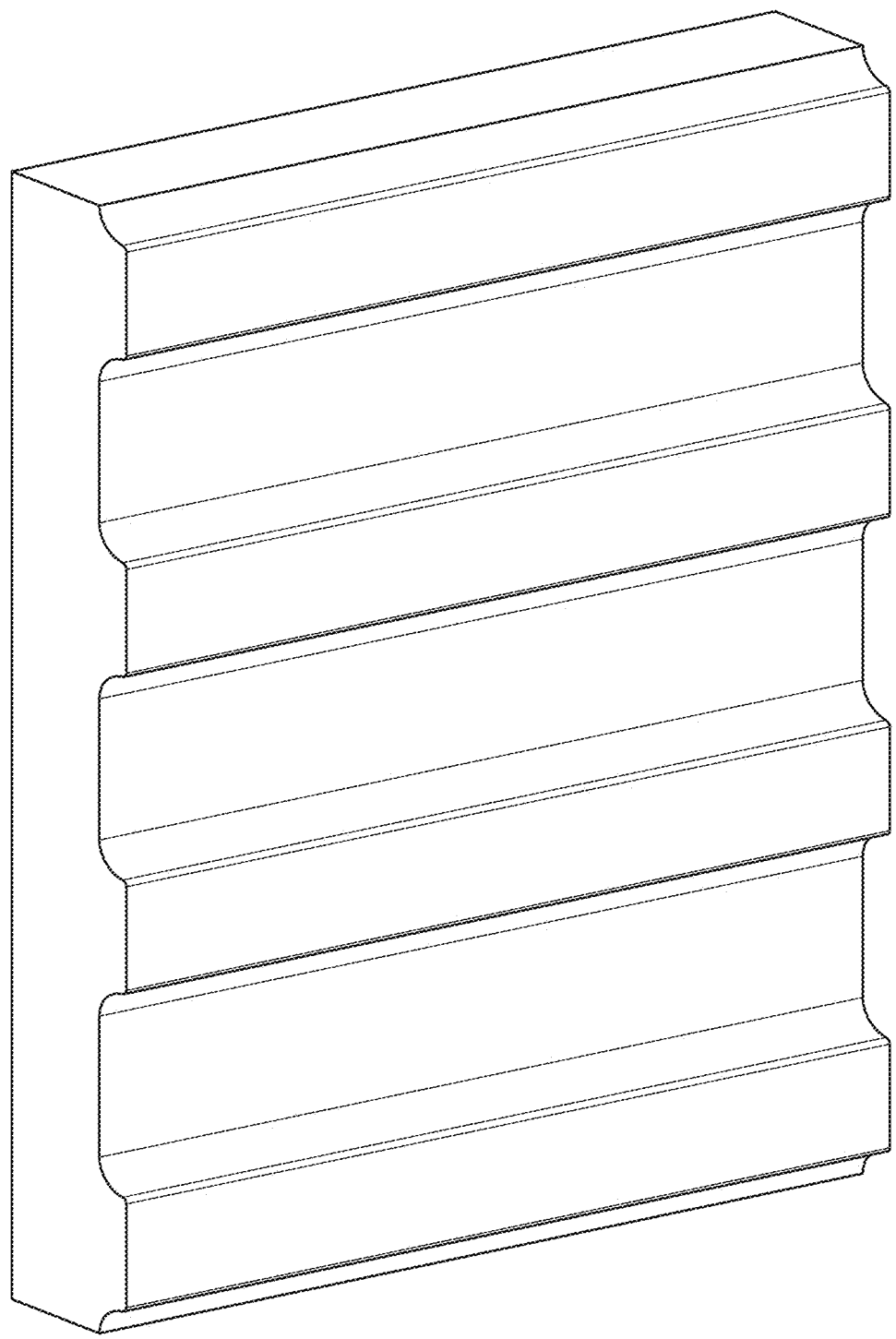
FIG. 13 depicts a profile view of the top of the Round Rib Style #4 mold.
Figure 14:
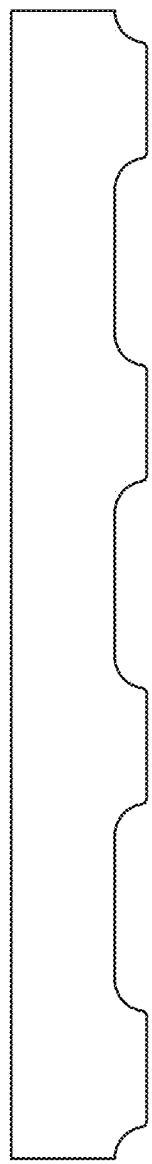
FIG. 14 depicts a side view of the Round Rib Style #4 mold.
Figure 15:
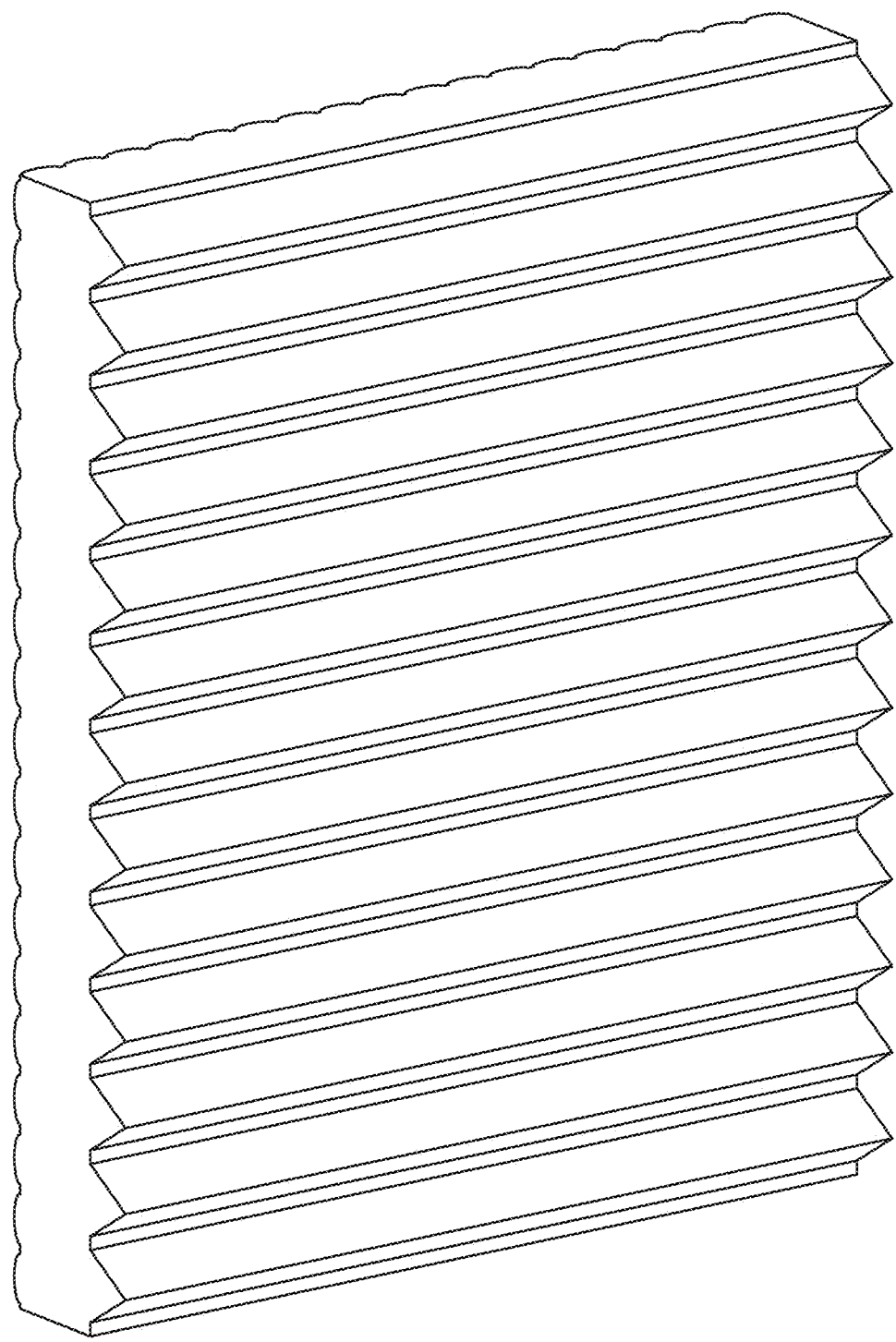
FIG. 15 depicts a profile view of the top of the Triangular Rib Style #1 mold.
Figure 16:
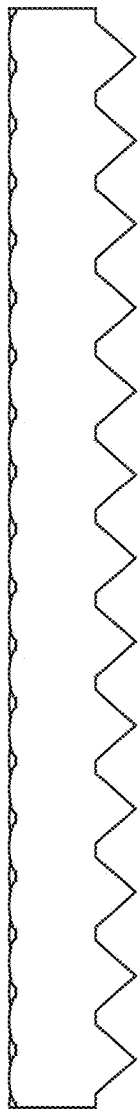
FIG. 16 depicts a side view of the Triangular Rib Style #1 mold.
Figure 17:
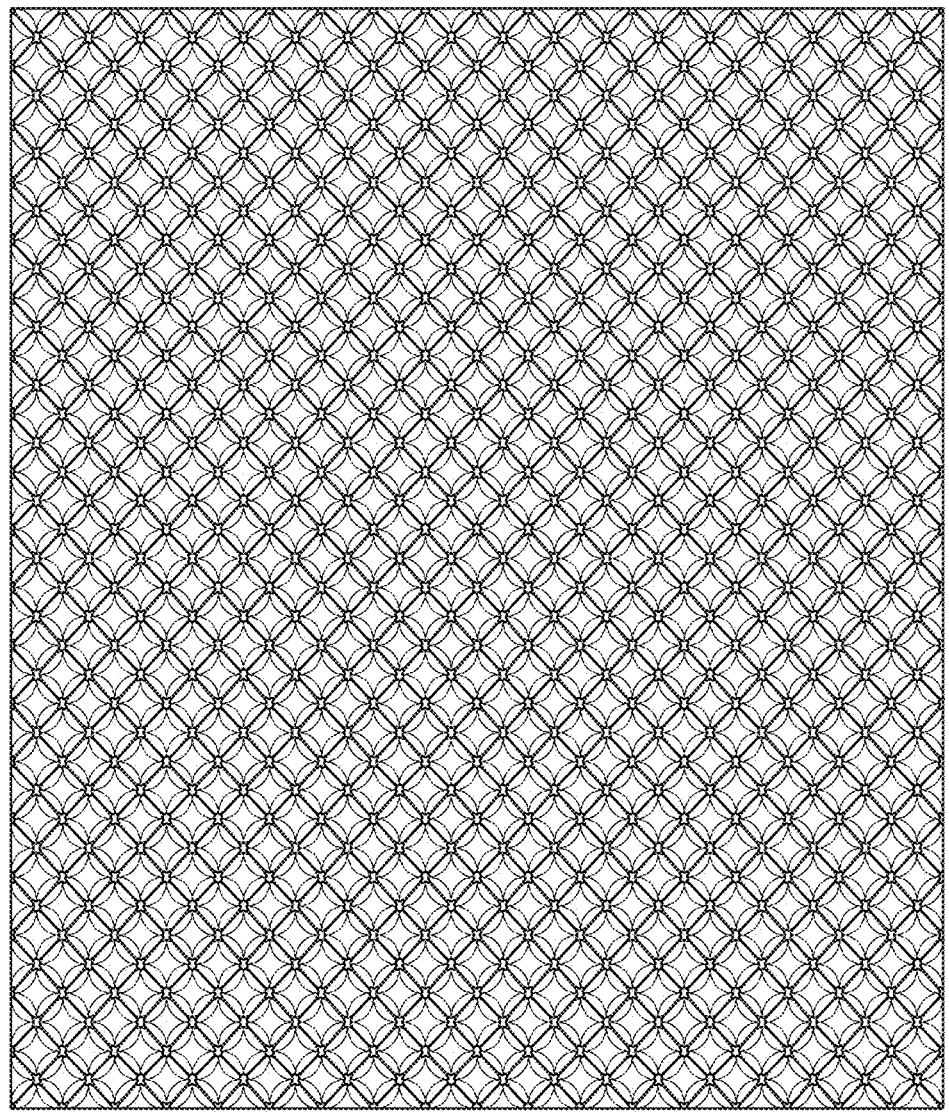
FIG. 17 depicts a bottom view of the Triangular Rib Style #1 mold.
Figure 18:
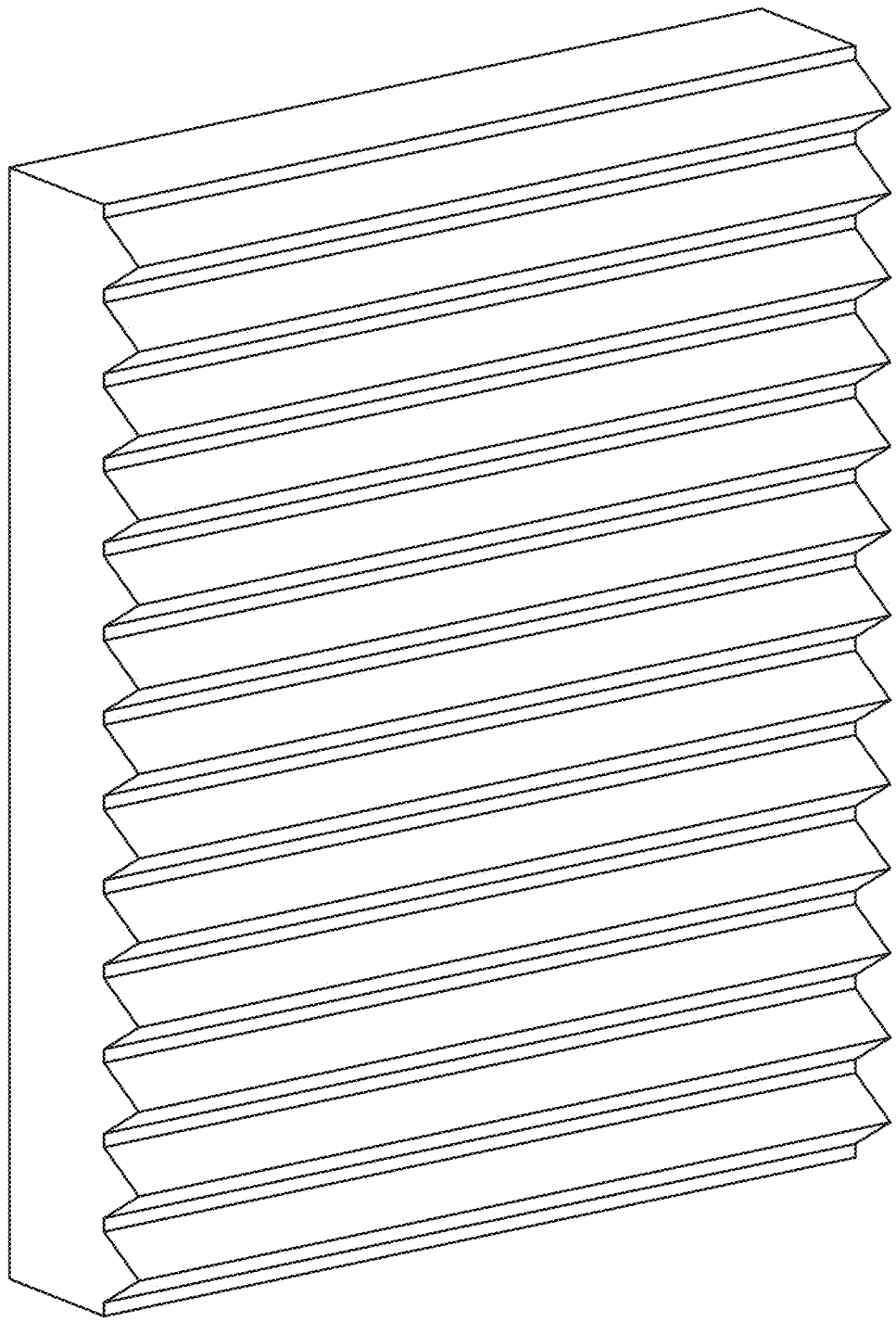
FIG. 18 depicts a profile view of the top of the Triangular Rib Style #2 mold.
Figure 19:
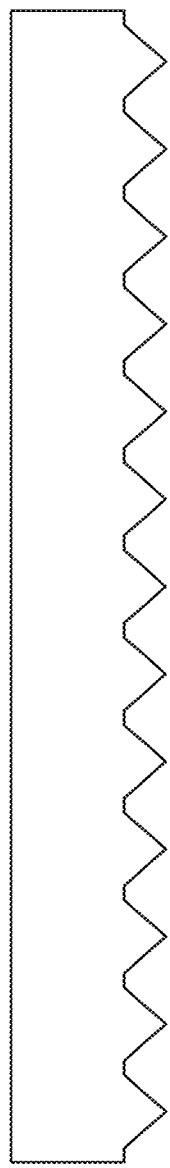
FIG. 19 depicts a side view of the Triangular Rib Style #2 mold.
Figure 20:
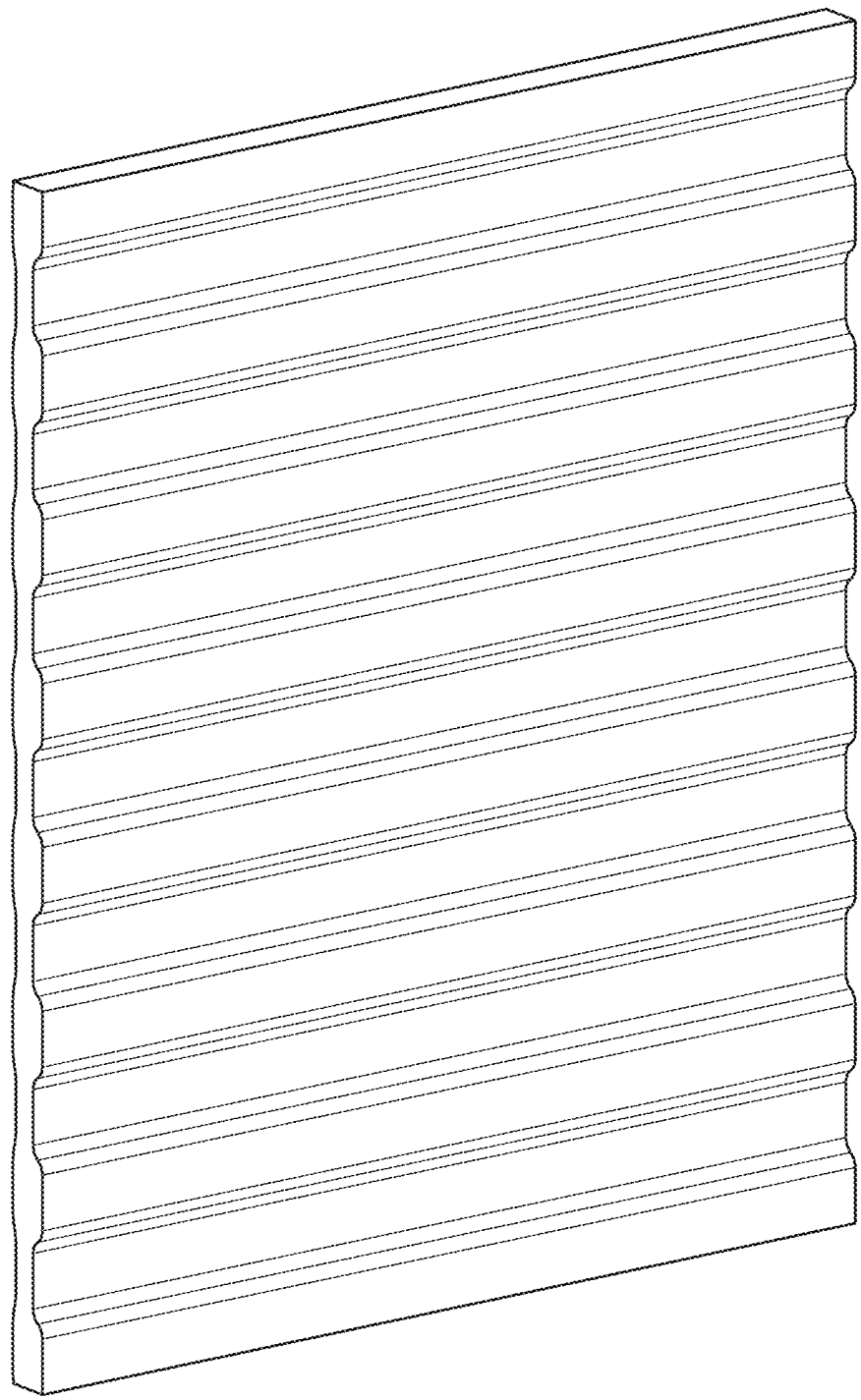
FIG. 20 depicts a profile view of the top of a carbon sheet that has One Sided Texture Round Rib Style #1 and Textured Backing for Added Strength.
Figure 21:
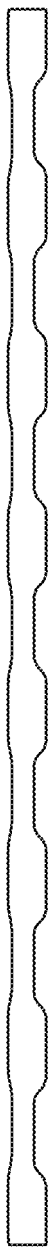
FIG. 21 depicts a side view of a carbon sheet that has One Sided Texture made from the Round Rib Style #1 mold and Textured Backing for Added Strength.
Figure 22:
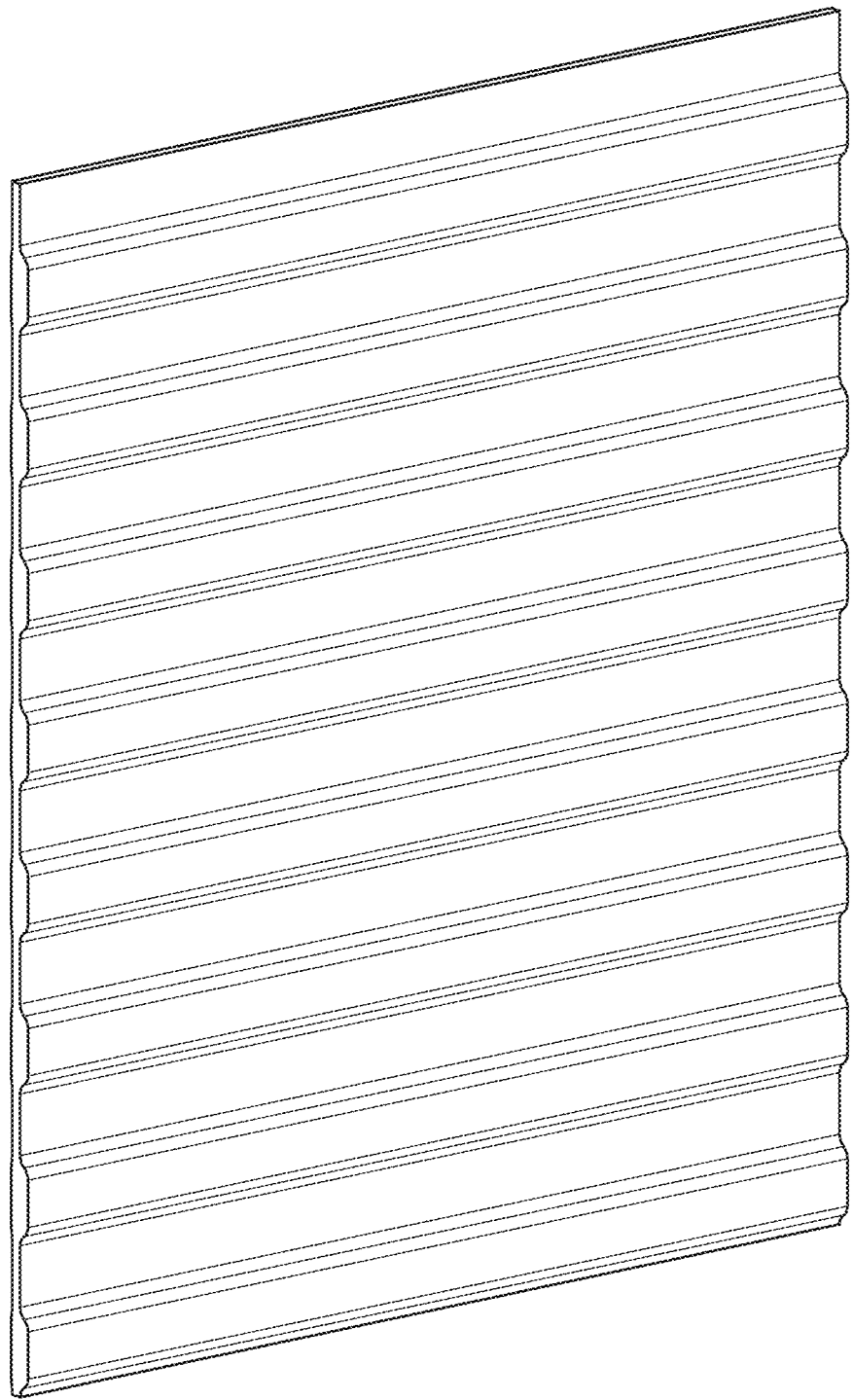
FIG. 22 depicts a profile view of the top of a carbon sheet that has One Sided Texture made from the Round Rib Style #3 mold.
Figure 23:
FIG. 23 depicts a side view of a carbon sheet that has One Sided Texture made from the Round Rib Style #3 mold.
Figure 24:
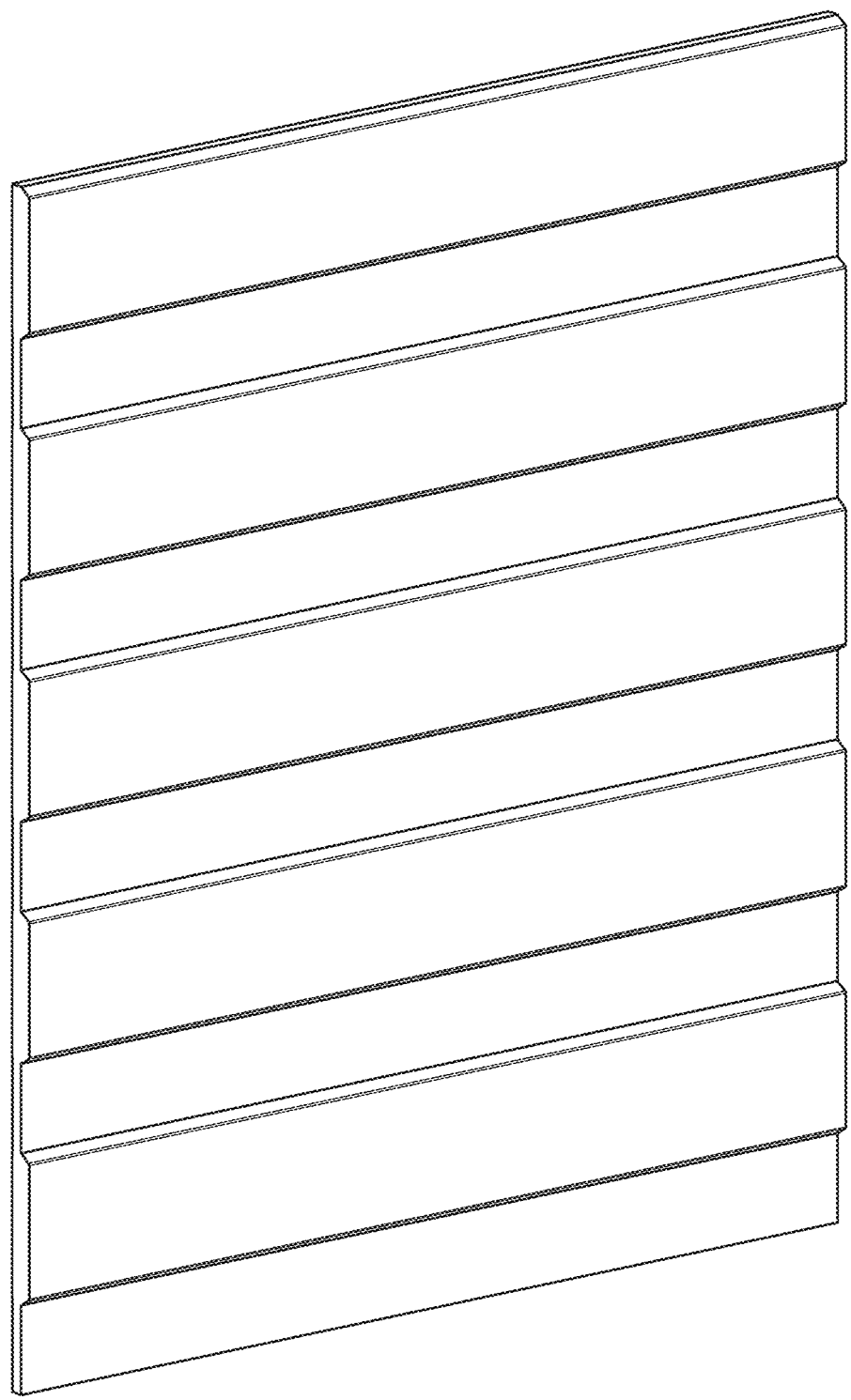
FIG. 24 depicts a profile view of the top of a carbon sheet that has One Sided Texture made from the Round Rib Style #4 mold.
Figure 25:
FIG. 25 depicts a side view of a carbon sheet that has One Sided Texture made from the Round Rib Style #4 mold.
Figure 26:
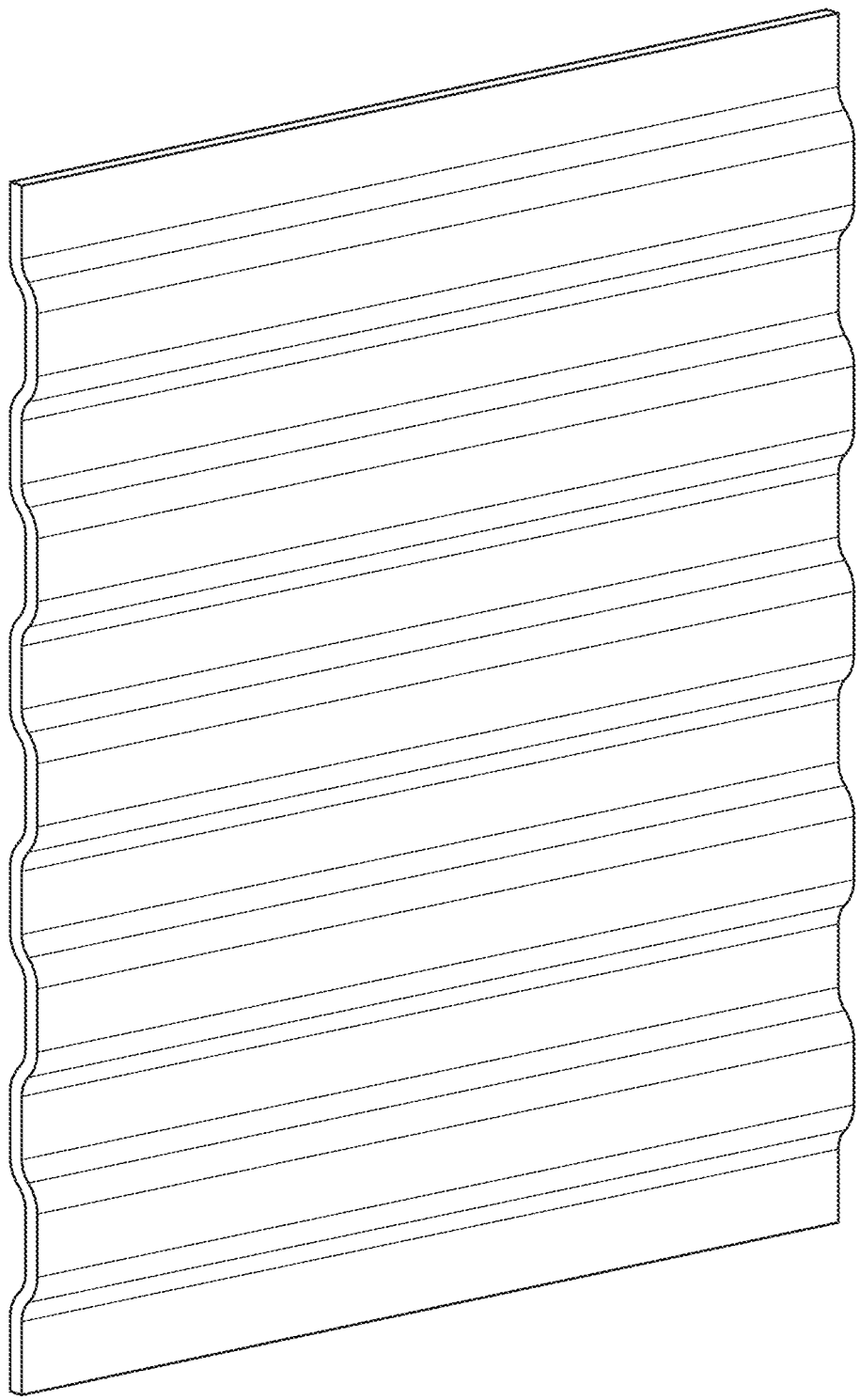
FIG. 26 depicts a profile view of the top of a carbon sheet that has Double Sided Texture made from the Round Rib Style #1 mold.
Figure 27:
FIG. 27 depicts a side view of a carbon sheet that has Double Sided Texture made from the Round Rib Style #1 mold.
Figure 28:
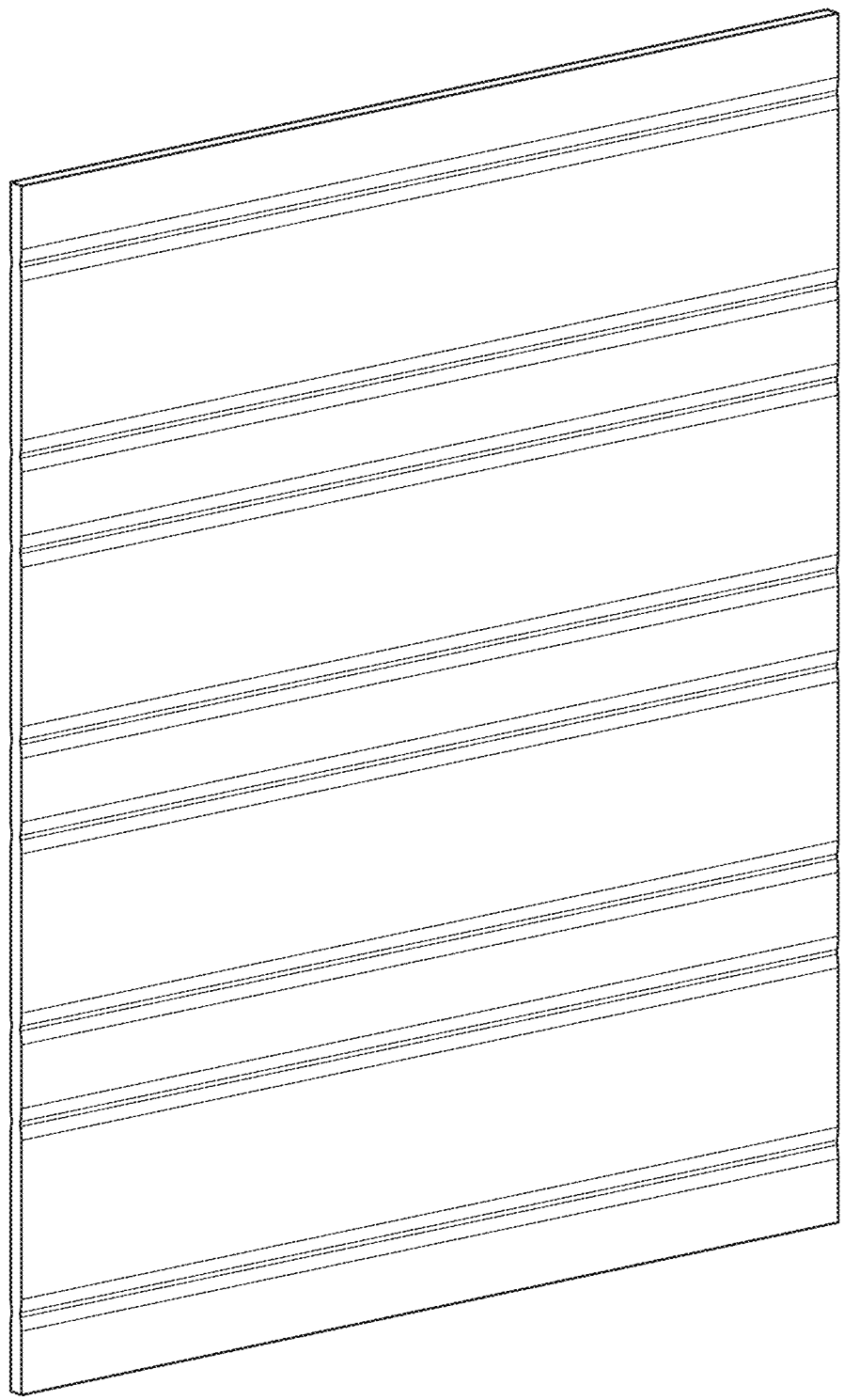
FIG. 28 depicts a profile view of the top of a carbon sheet that has Double Sided Texture made from the Round Rib Style #4 mold.
Figure 29:
FIG. 29 depicts a side view of a carbon sheet that has Double Sided Texture made from the Round Rib Style #4 mold.
Figure 30:
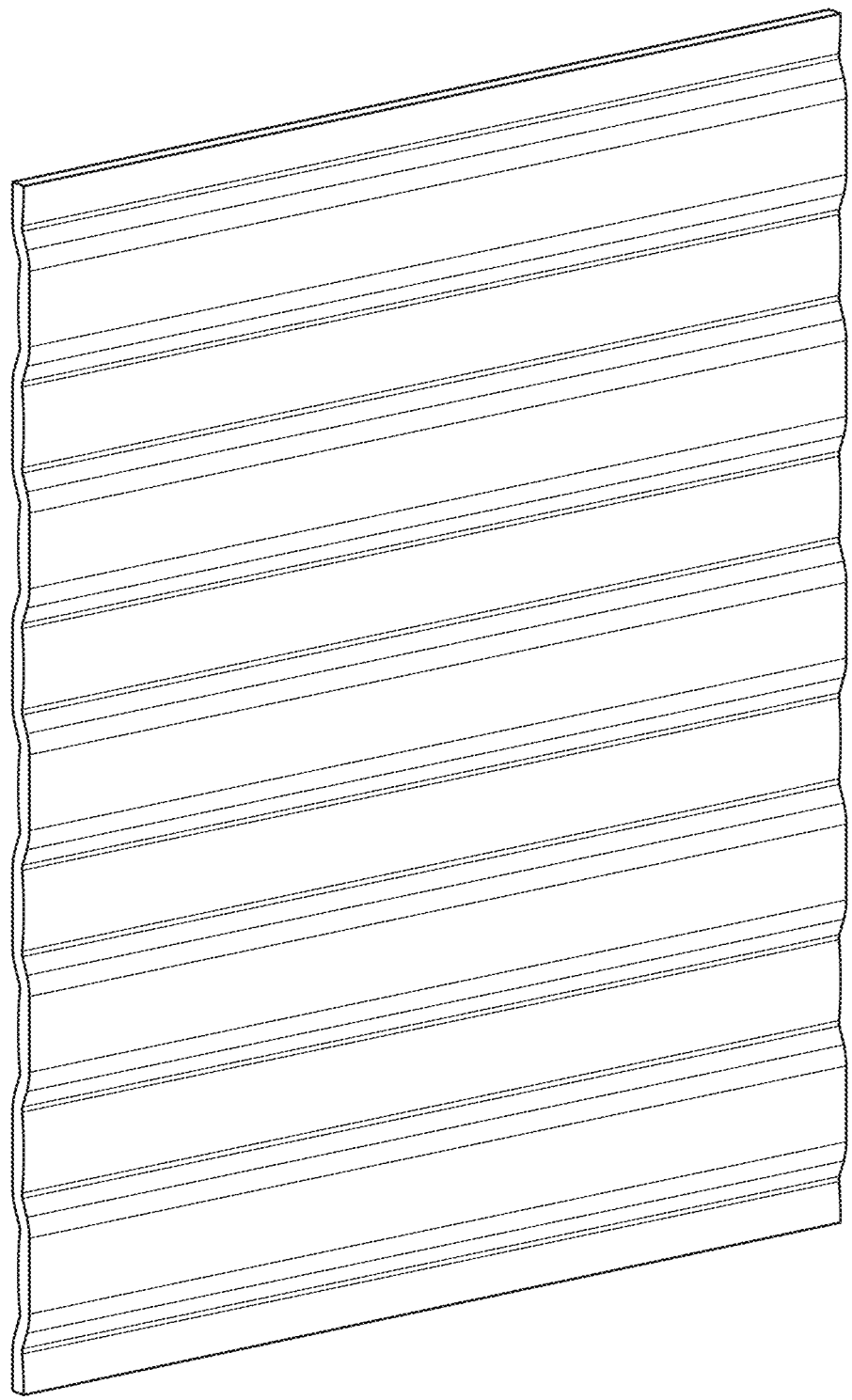
FIG. 30 depicts a profile view of the top of a carbon sheet that has Double Sided Texture made from the Round Rib Style #4 mold and with the molds offset from one another.
Figure 31:
FIG. 31 depicts a side view of a carbon sheet that has Double Sided Texture made from the Round Rib Style #4 mold and with the molds offset from one another.
Figure 32:
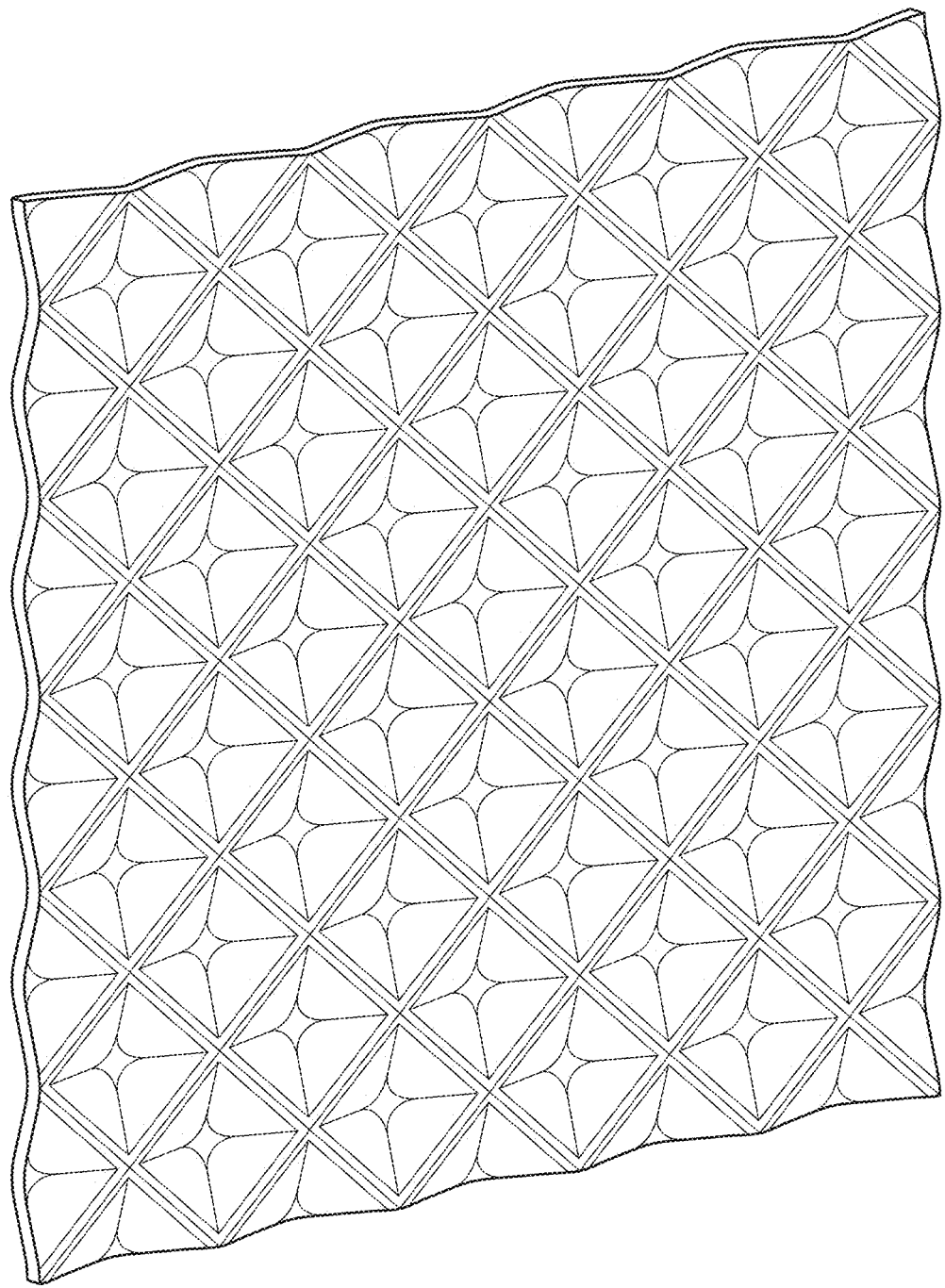
FIG. 32 depicts a profile view of the top of a carbon sheet that has Combination Pattern made from the Diamond mold on top and made from the Triangular Rib Style #1 mold on the bottom.
Figure 33:
FIG. 33 depicts a side view of a carbon sheet that has Combination Pattern made from the Diamond mold on top and made from the Triangular Rib Style #1 mold on the bottom.
Figure 34:
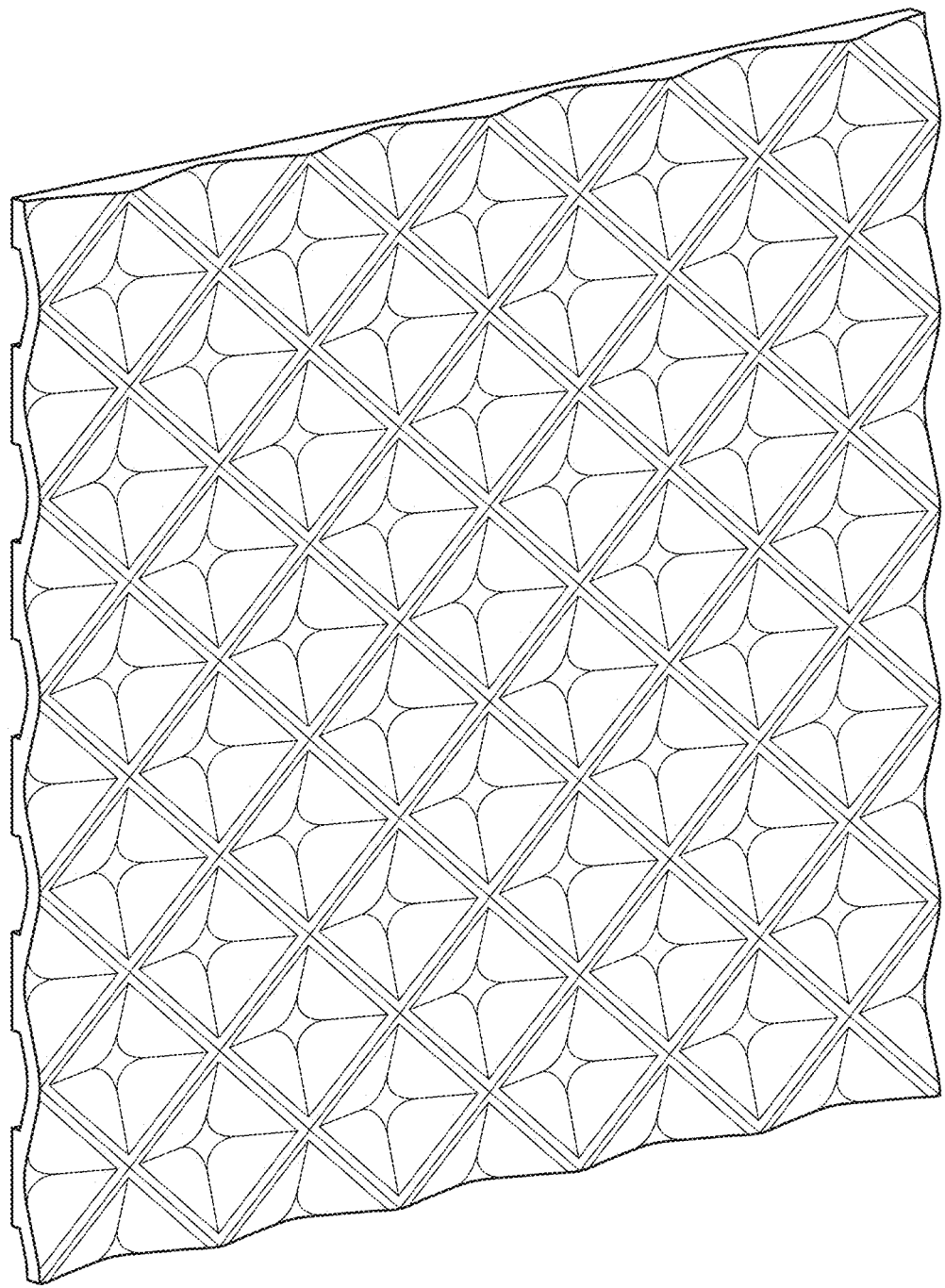
FIG. 34 depicts a profile view of the top of a carbon sheet that has Combination Pattern made from the Diamond mold on top and made from the Round Rib Style #2 mold on the bottom.
Figure 35:
FIG. 35 depicts a side view of a carbon sheet that has Combination Pattern made from the Diamond mold on top and made from the Round Rib Style #2 mold on the bottom.
Figure 36:
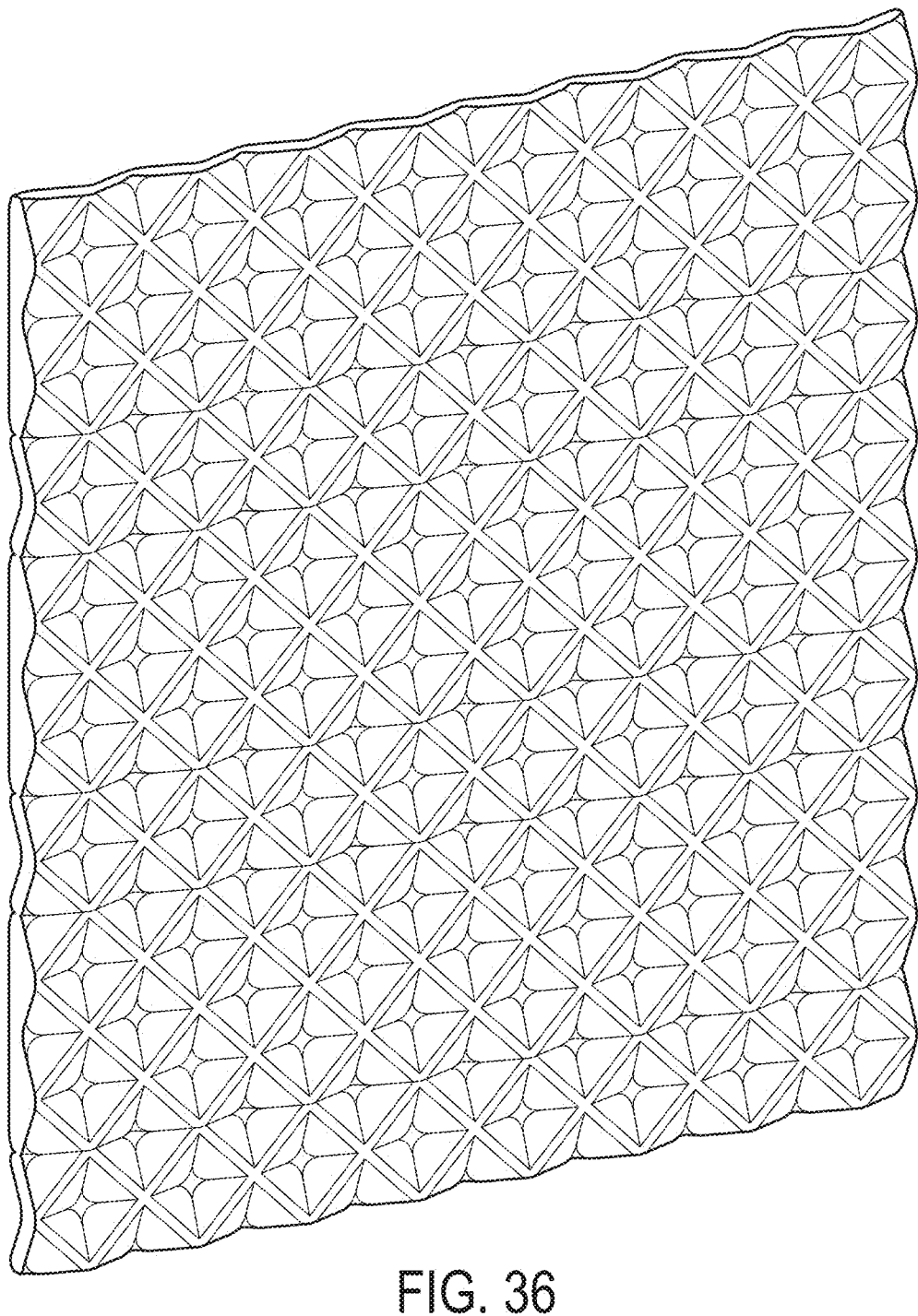
FIG. 36 depicts a profile view of the top of a carbon sheet that has Combination Pattern made from the Diamond mold on top and made from the Round Rib Style #4 mold on the bottom.
Figure 37:
FIG. 37 depicts a side view of a carbon sheet that has Combination Pattern made from the Diamond mold on top and made from the Round Rib Style #4 mold on the bottom.
Figure 38:
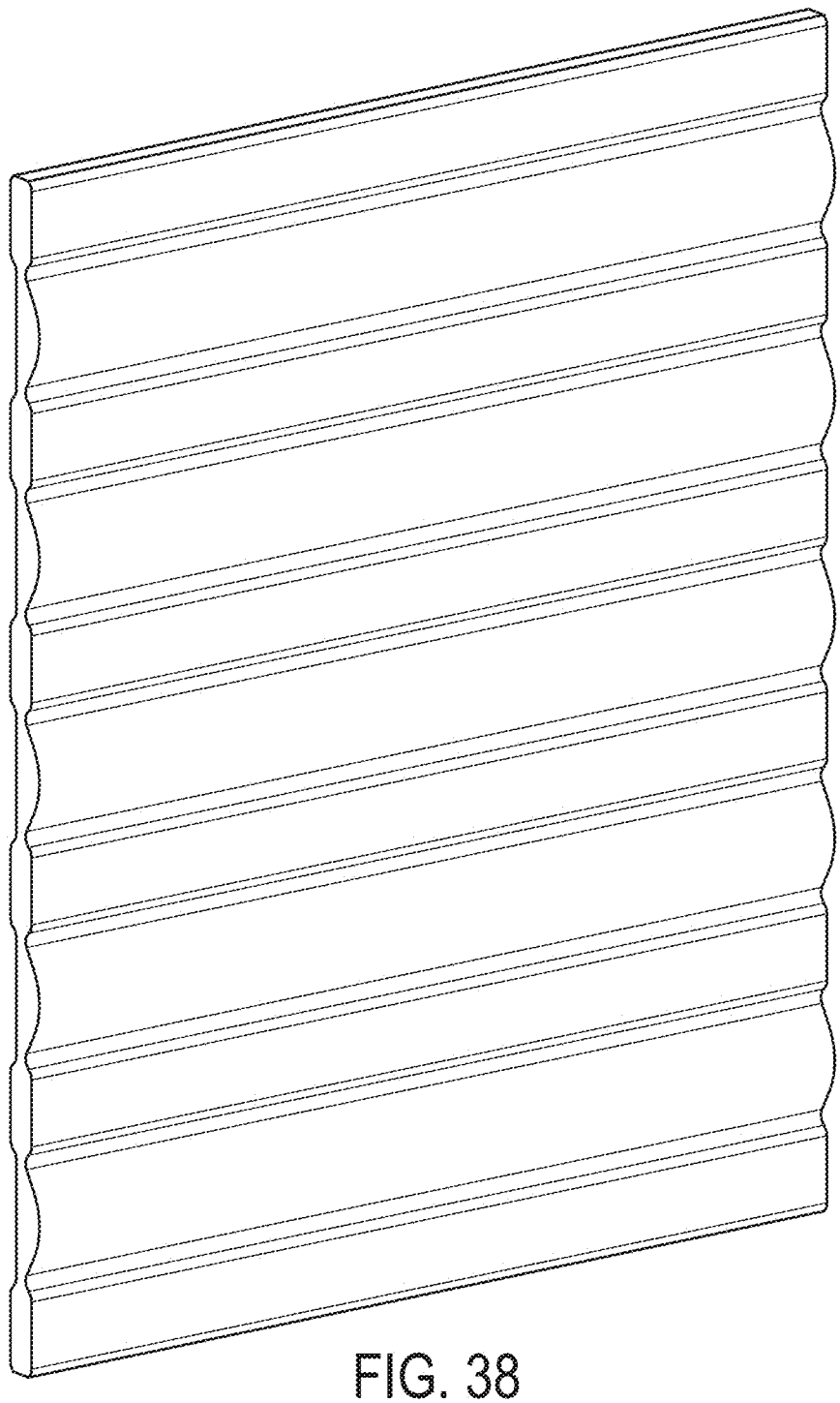
FIG. 38 depicts a profile view of the top of a carbon sheet that has Combination Pattern made from the Round Rib Style #3 mold on top and made from the Triangular Rib Style #2 mold on the bottom.
Figure 39:
FIG. 39 depicts a side view of a carbon sheet that has Combination Pattern made from the Round Rib Style #3 mold on top and made from the Round Rib Style #2 mold on the bottom.
Figure 40:
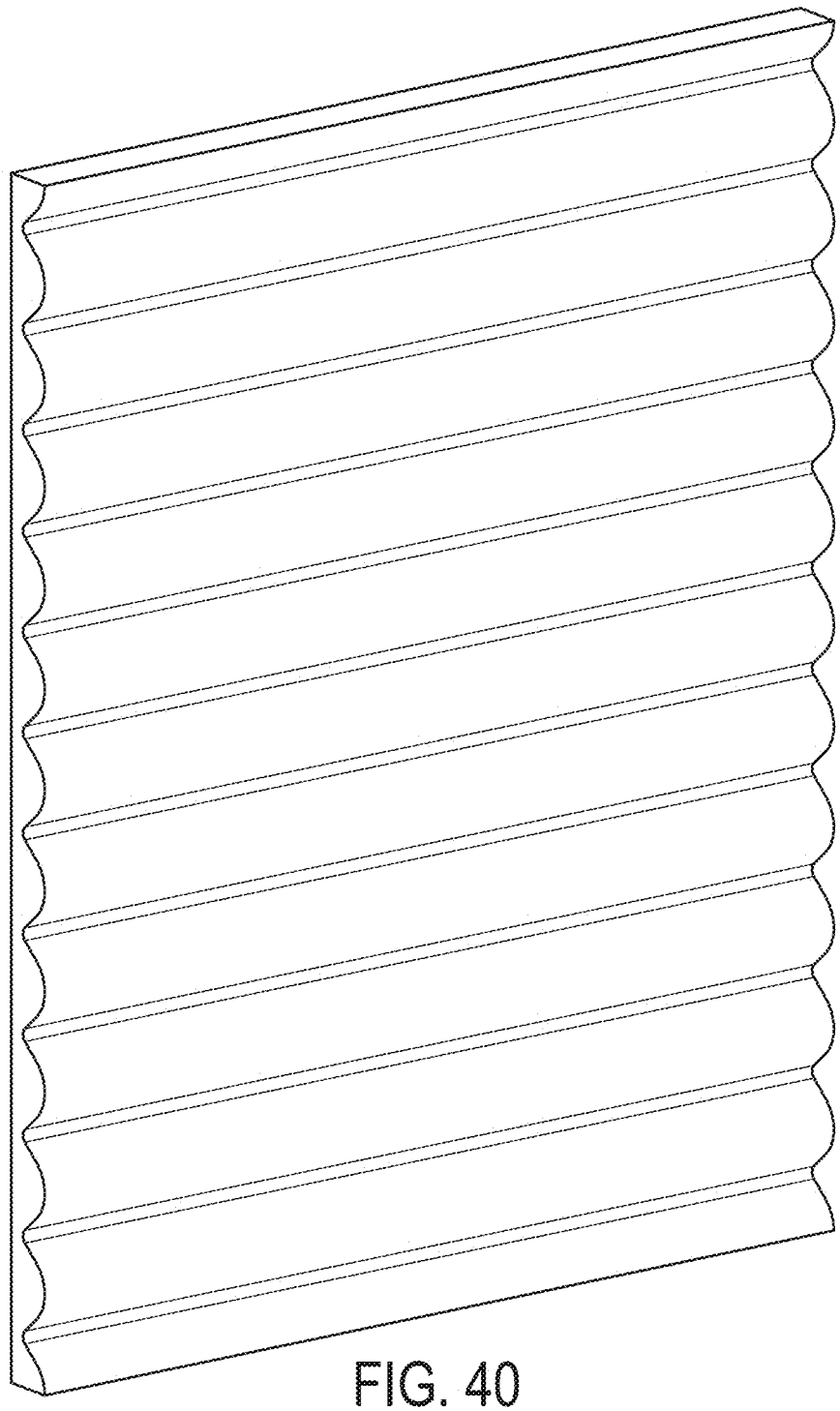
FIG. 40 depicts a profile view of the top of a carbon sheet that has One Sided Texture made from the Triangular Rib Style #1 mold.
Figure 41:
FIG. 41 depicts a side view of a carbon sheet that has One Sided Texture made from the Triangular Rib Style #1 mold.
Figure 42:
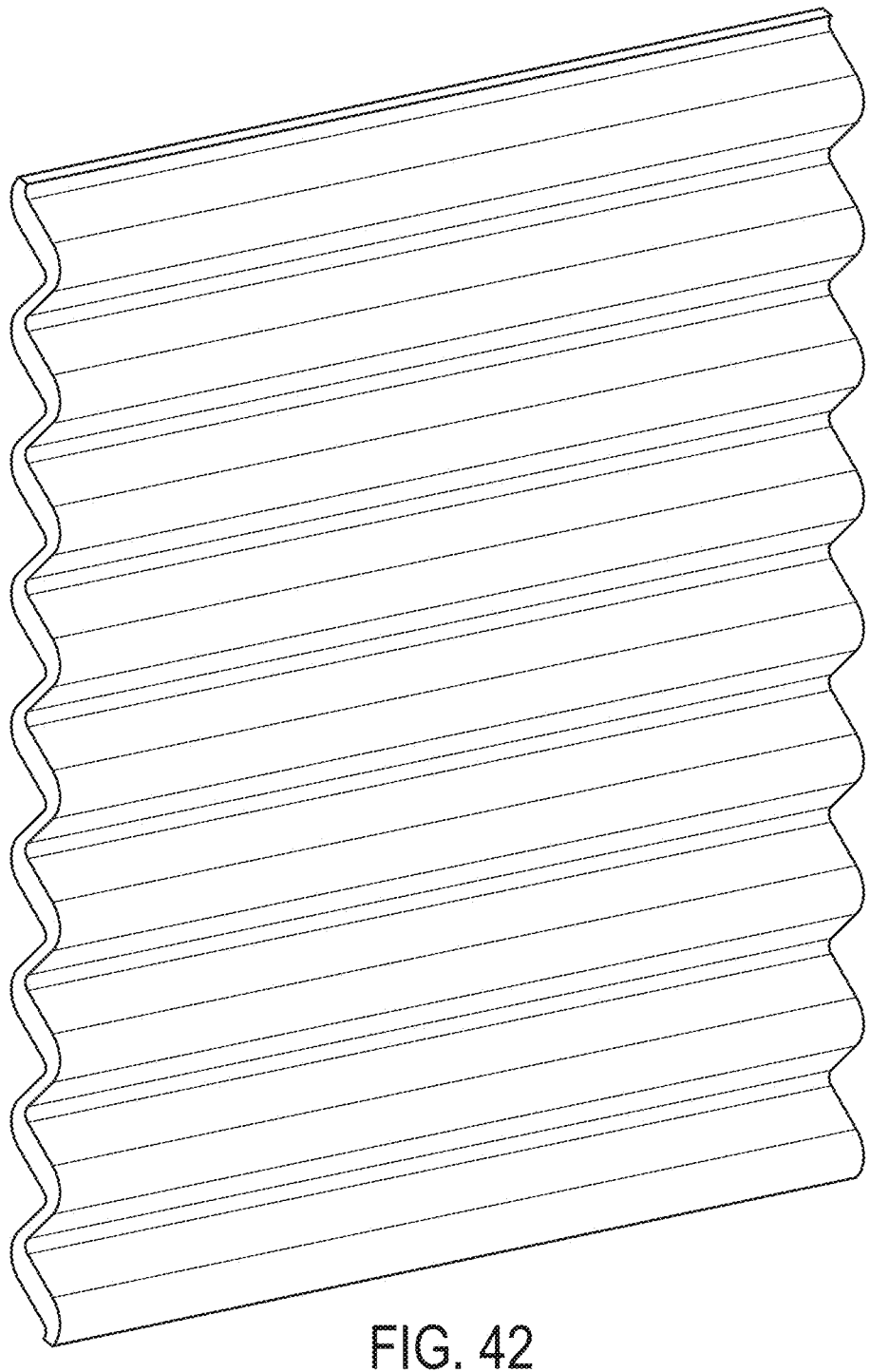
FIG. 42 depicts a profile view of the top of a carbon sheet that has Double Sided Texture made from the Triangular Rib Style #1 mold.
Figure 43:
FIG. 43 depicts a side view of a carbon sheet that has Double Sided Texture made from the Triangular Rib Style #1 mold.
Figure 44:
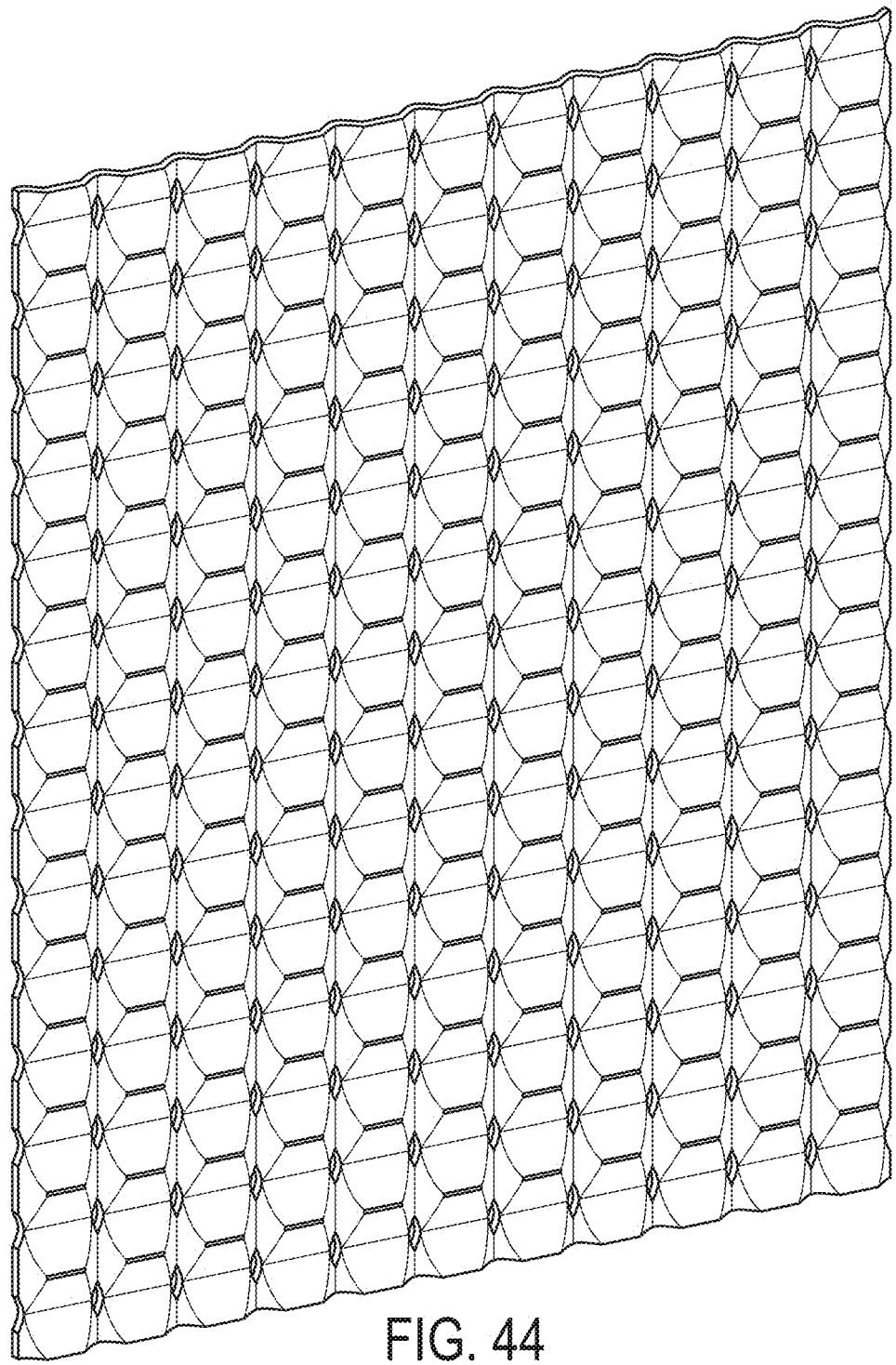
FIG. 44 depicts a profile view of the top of a carbon sheet that has Double Sided Texture with molds perpendicular made from the Triangular Rib Style #1 mold and made from a thin carbon sheet.
Figure 45:
FIG. 45 depicts a side view of a carbon sheet that has Double Sided Texture with molds perpendicular made from the Triangular Rib Style #1 mold and made from a thin carbon sheet.
Figure 46:
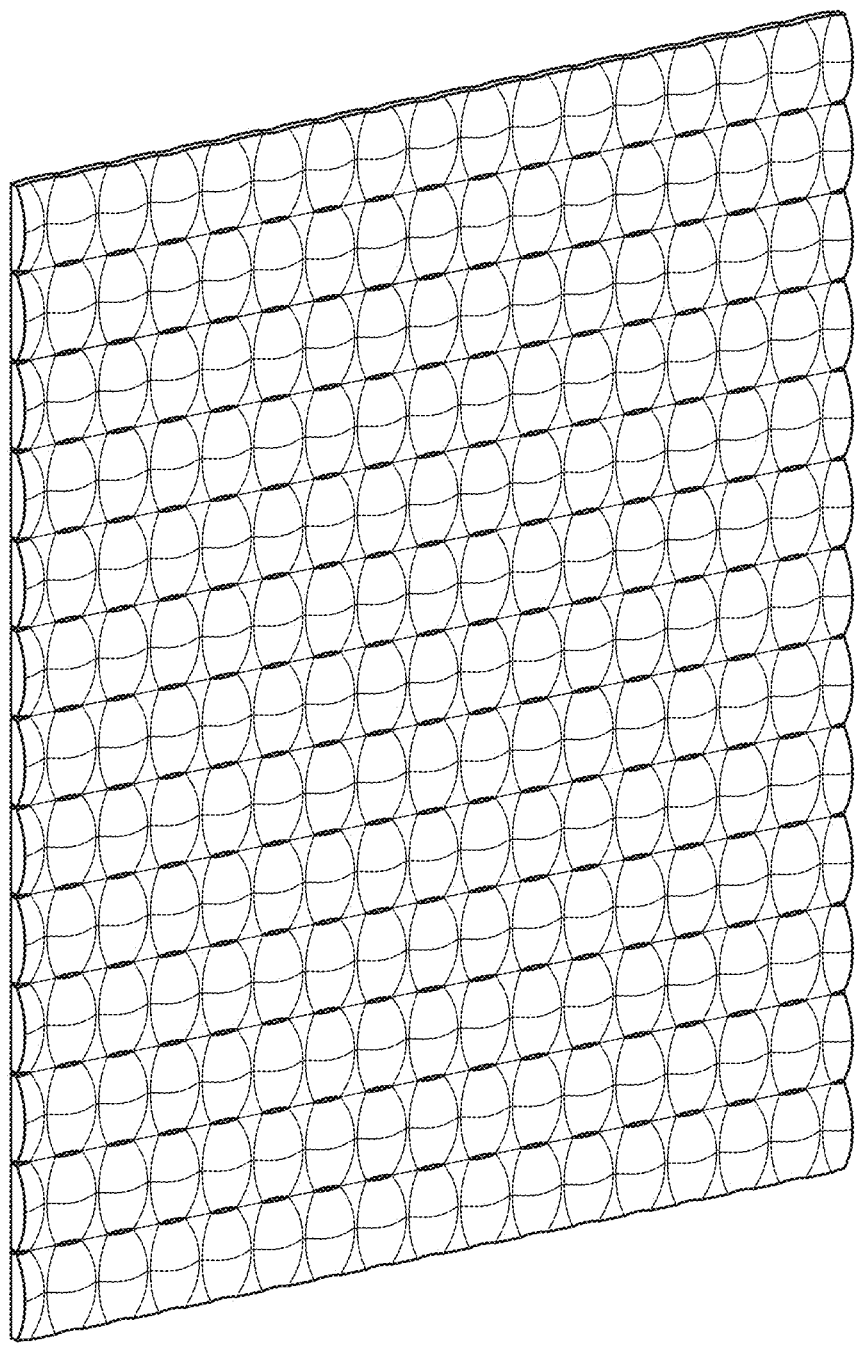
FIG. 46 depicts a profile view of the top of a carbon sheet that has Double Sided Texture with molds perpendicular made from the Triangular Rib Style #1 mold and made from a thick carbon sheet.
Figure 47:
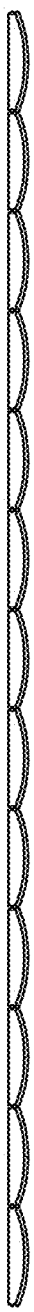
FIG. 47 depicts a side view of a carbon sheet that has Double Sided Texture with molds perpendicular made from the Triangular Rib Style #1 mold and made from a thick carbon sheet.
Figure 48:
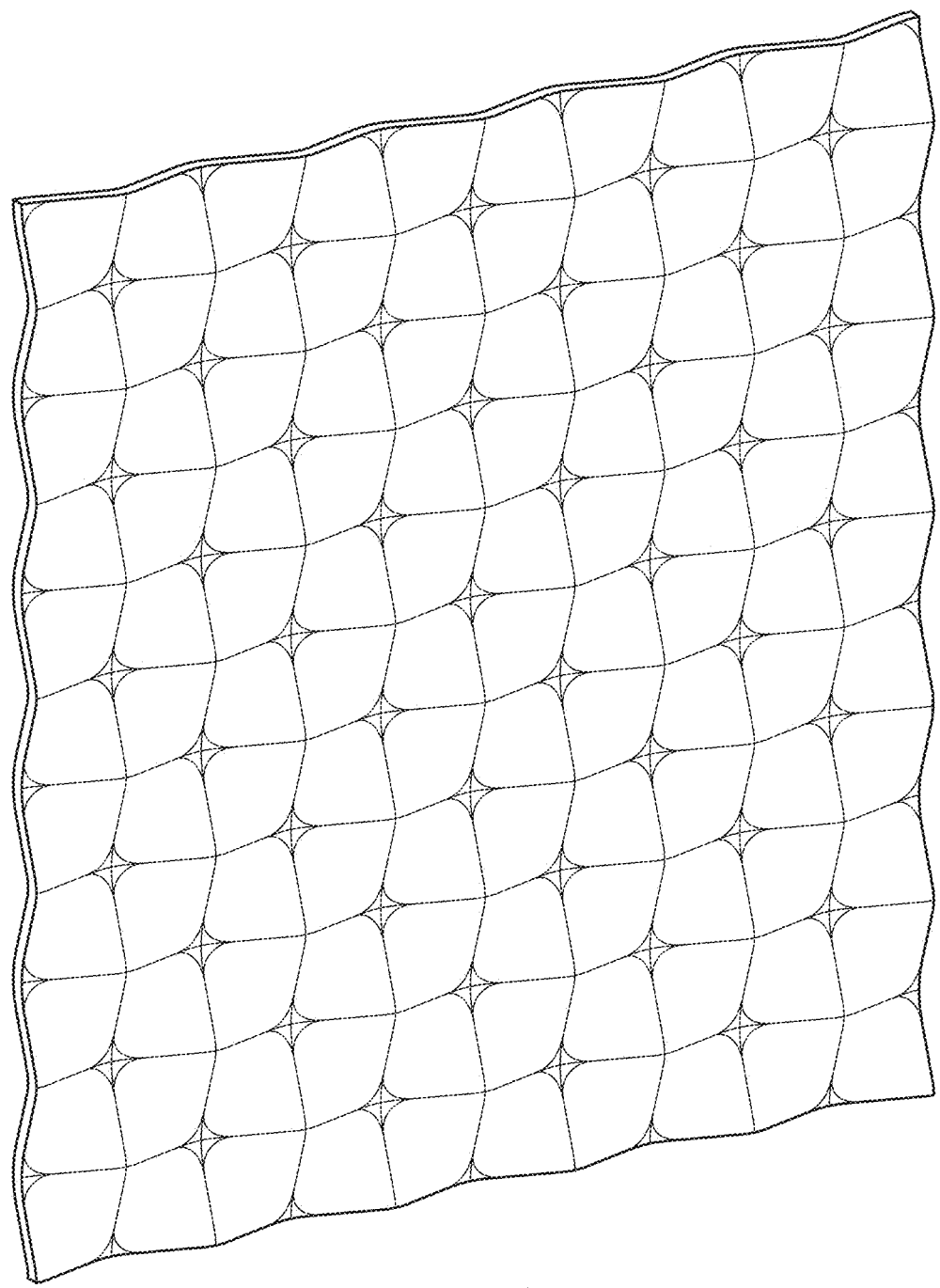
FIG. 48 depicts a profile view of the top of a carbon sheet that has Double Sided Texture made from the Diamond mold.
Figure 49:
FIG. 49 depicts a side view of a carbon sheet that has Double Sided Texture made from the Diamond mold.

FIGS. 1-3 depict some standard views of a mold according to some embodiments. The mold 100 itself may be rubber, and defines a front surface 200, and a rear surface 300. The front surface 200 is defined by a series of hills 210 and valleys 220 which form a texture, here a repeating diamond texture. These hills and valleys create corresponding hills and valleys in the resultant textured sorbent sheet, see e.g. FIGS. 20-49. The back surface 300 may be smooth, patterned, or textured. "Patterned," as used herein is distinct from "textured." The rear surface 300 may contain a pattern resultant from picking up the pattern during the texturing process. It was surprisingly discovered, that imprinting a pattern on the back surface of the sheet improved handling properties such as strength, grip (frictional hold), etc. These patterns can be imparted by patterns on rolls such as printing rolls, transfer rolls, guide rolls, etc. or via other printing techniques. These patterns are not so large as for the hills and valleys as found on the "textured" side of the sheet. Thus, "texture" as used herein, refers to, in the mold, the hills and valleys used to create the complementary hills and valleys on the textured sheet. In the textured sheet, the texture (i.e. hills and valleys) provides pathways for fluid flow.

In some embodiments, the mold or wrap can be adapted for imprinting the sorbent sheet in multiple passes. For example, a mold or wrap can be used in one direction and then rotated, for example perpendicularly, for a second pass to create a new texture. FIGS. 44-47 depict textured sheets made from such a process.

The Sorbent Material Sheets

The sorbent material sheets of the invention may include any of the sorbent materials described above including, but are not limited to, activated carbon, carbon nanotubes, graphenes, natural and synthetic zeolite, silica, silica gel, alumina, zirconia, clay, carbon black, and diatomaceous earths. In certain embodiments, the sorbent material sheets may be composed of activated carbon. The sorbents may be used alone or in combination.

The activated carbon may be of various grades and types selected based on performance requirements, cost, and other considerations. The activated carbon may be granular from reagglomerating a powder, granular from crushing or sizing nutshells, wood, coal or pellets created by extrusion, or activated carbon in powdered form. The activated carbon may be formed by processes of carbonization and activation. The raw material, such as wood, nutshell, coal, pitch, etc. is oxidized and devolatized, and activated with steam and/or carbon dioxide gasified to form the pore structure in the activated carbon which is useful for adsorption. The initial oxidation and devolatilization and activation processes may include a chemical treatment with a dehydrating chemical, such as phosphoric acid, sulfuric acid, sodium hydroxide, potassium hydroxide, and combinations of those.

A variety of activation processes are known in the art. The most useful processes for providing activated carbon for the sorbent material sheets of the claimed invention involve a step of providing wood and/or wood byproduct, acid treating the wood and/or wood byproducts by exposure to phosphoric acid, and carbonizing the wood and/or wood byproducts using steam and/or carbon dioxide gasification. This process results in activated carbon particles having the highest butane working capacity (BWC), which is a measure of activated carbon performance BWC measurements are referenced in two ways in the present disclosure. One test method is the ASTM D5228 method, "Standard Test Method for Determination of Butane Working Capacity of Activated Carbon." This method is referred to in this disclosure as ASTM BWC. A second method is referred to as EPA BWC, and is referenced in the United States Code of Federal Regulations, CFR 86.132-96, section (h). These methods were modified as required to fit the various textured sheet configurations described below. In particular, for the ASTM BWC, the sheets are tightly wound to occupy the same volume in a 1 in diameter as the test method calls for in a smaller diameter. For the EPA BWC method, for laboratory evaluation, 5 cycles of adsorption and purge were run, and the last three averaged to obtain a value.

The activated carbon may be formed from materials including bagasse, bamboo, coconut husks, peat, wood such as hardwood and softwood sources in the form of sawdust and scrap, lignite, coal and coal tar (bituminous and sub-bituminous), petroleum pitch, asphalt and bitumen, corn stalks and husks, wheat straw, spent grains, rice hulls and husks, nutshells, and combinations thereof.

The sorbent material sheets may further include one or more binders. Embodiments are not limited to particular binders, which can include polytetrafluoroethylenes (PTFE or TEFLON), polyvinylidene fluorides (PVF2 or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. The binders can be thermoplastic or thermosetting as conditions require, and can include mixtures of thermoplastic and thermosetting compounds.

The amount of binder may be about 5% to about 40% by weight of the total composition, and in certain embodiments, the amount of binder may be about 5% to about 20% by weight, about 5% to about 15% by weight, or about 5% to about 10% by weight of the total composition, or any individual amount or range encompassing these example amounts. In some embodiments, the amount of binder is about 11% by weight. In some embodiments, the sorbent material sheets may include a solvent, which may generally be present in small, residual, amounts of, for example, less than about 10%, less than about 5%, or less than about 2% and greater than about 0.1% or about 0.2% by weight. In particular, in some embodiments the sorbent material sheets may have no (0%) solvent. When the above amounts of materials are selected, in some embodiments, the remaining balance of material is the sorbent material, described above.

In some embodiments, the textured sorbent material sheets may have a thickness measured at a valley of less than about 1 mm, about 0.1 mm to about 1.0 mm, about 0.2 mm to about 0.90 mm, about 0.5 to about 0.95 mm, about 0.5 to about 0.90 mm or any individual thickness or range encompassed by these example ranges.

In some embodiments, the textured sorbent material sheets may have a thickness measured at a hill or peak of about 1.0 to about 1.5 mm, about 1.5 mm, about 1.4 mm, about 1.3 mm, about 1.2 mm, about 1.1 mm, about 1.0 mm, or any individual thickness or range encompassed by any two of these values.

In some embodiments, the distance from the tip of a hill to the bottom of a valley is about 0.5 mm to about 1.0 mm. In some embodiments, the distance is about 0.6 mm, about 0.5 mm, about 0.4 mm, about 0.3 mm, about 0.2 mm, 0.1 mm, or any individual distance or range encompassed by any two of these values.

The sorbent material sheets of various embodiments may have a density of about 0.05 g/mL to about 2.0 g/mL as measured by the particle density test, and in other embodiments, the sorbent material sheets may have a density of 0.08 g/mL to about 1.5 g/mL, about 0.1 g/mL to about 1.3 g/mL as measured by the particle density test, or any density or range encompassed by these example ranges. The ASTM BWC for each sorbent material sheet may be greater than about 10 g/100 mL, and in some embodiments, the ASTM BWC may be from about 7.0 g/100 mL to about 30 g/100 mL, about 8.0 g/100 mL to about 25 g/100 mL, about 10 g/100 mL to about 20 g/100 mL, about 10 g/100 mL to about 15 g/100 mL, about 11 g/100 mL to about 15 g/100 mL, about 12 g/100 mL to about 15 g/100 mL or any individual BWC or range encompassed by these example ranges. In other examples, the ASTM BWC may be about 9 g/100 mL to about 15 g/100 mL, about 12 g/100 mL to about 20 g/100 mL, about 13 g/100 mL to about 20 g/100 mL, about 14 g/100 mL to about 20 g/100 mL, or about 15 g/100 mL to about 20 g/100 mL. It is also contemplated that any of the endpoints of the above ranges may be combined to form new and distinct ranges. In some embodiments, each sorbent sheet has a density of about 0.08 g/mL to about 1.5 g/mL.

The sorbent material sheets of the present invention have higher performance as measured by the ASTM BWC than conventional sorbent materials which are provided in powders or other particulate forms.

The sorbent material sheets of embodiments can be made by any suitable process. In some embodiments, sorbent material sheets can be made by pulverizing granular or pelletized sorbent material to a powder, mixing the powder with a binder to form a mixture. High shear mixing of the mixture is preferred and rolling the mixture to form the sorbent material sheet. Heating can also be used to aid in the mixing and rolling of the material. The step of pulverizing may produce sorbent particles having an average particle diameter of about 0.001 mm to about 0.2 mm, about 0.005 mm to about 0.1 mm, about 0.01 mm to about 0.075 mm, or any individual particle diameter or range encompassed by these example ranges, and in certain embodiments, the pulverized sorbent particles may have an average particle diameter of about 0.001 mm to about 0.01 mm. The step of mixing the powder with a binder may include mixing the sorbent particle powder with about 5% to about 40% by weight or about 5% to about 10% by weight of the total composition, or any individual amount or range encompassed by these example ranges. Optional heating can be carried out at any temperature sufficient to remove residual solvent such as, for example, about 50° C. to about 200° C.

The sorbent material sheet of the invention may include various distributions of different sized particles to increase the packing efficiency of the powder within the sorbent material sheets. The selection of different sized particles can also improve rheological properties of the powder and surrounding binders, which allows improved mixing and uniform particle distribution before formation of the sorbent material sheets. In some embodiments, the particles of the sorbent material sheet may have a single particle size distribution, and in other embodiments, the particles may have two different particle size distributions. In further embodiments, the particle may have at least three different particle size distributions.

The mean particle sizes of the at least two different particle populations, each having a particular size distribution, may be selected so that they have a ratio of between about 1:1 and about 1:15. In other embodiments, the mean particle sizes of the two different particle populations may have a ratio of about 1:1 to about 1:10. The mean particle sizes may also have a ratio of about 1:1 to about 1:5, or combinations of any of the above listed ratios.

The spiral and stacked sheet assemblies have significantly higher ASTM BWC sorbent capacity than prior art fuel vapor recovery adsorbents for a given volume. This capability can be utilized in various ways. In some embodiments, the sorbent material sheets can provide enhanced pollution controls in jurisdictions where such high levels of control are required. In other embodiments, the overall size, cost, and weight of an onboard refueling vapor recovery (ORVR) can be reduced for a specific level of performance. In further embodiments, an ORVR adsorption device can be designed which has increased performance over conventional adsorption canisters, thereby allowing the designer to omit costly and complex returnless fuel pump systems which would otherwise be required to reduce evaporative emissions. Higher performance adsorption devices may also render active condensing vapor systems unnecessary, which avoids the size, weight, and cost of compressor pumps and condensate storage tanks. It should be understood, however, that the ORVR adsorption device using the sorbent material sheets of the invention can also be combined with these devices for exceptionally high performance and a minimal size, weight, and cost penalty over conventional systems.

The sorbent material sheets may be configured together in a variety of ways depending on the physical space that they must conform to, the required device performance, and the features which are included in proximity to the sheets. In some embodiments, the sheets may be include folds, and/or include holes or apertures to increase the surface area of the sorbent material sheets that is exposed to the passing fluid, therefore increasing performance for a given total sheet surface area. The various folds, holes, and apertures can also be sized and placed to make way for internal and external features, such as fluid channels, tubing, sensors, and valves. The folds of the sorbent material sheets may take a variety of forms, such as a spiral wrapped configuration in either a cylindrical or elliptical form. The folds may also be in the form of an "S" shape, or a convex or concave "C" shape depending on the required device dimensions and/or any other required internal or external features. The sorbent material sheets may also be stacked in a flat or curved configuration, and the stacked sheets may be square, rectangular, circular, oval, or other irregular shape as needed to fit the space intended. This, in combination with the housing features discussed below, enables devices formed from the sorbent material sheets to fit in smaller, more irregularly shaped spaces than prior art canister devices, which maximizes vehicle interior space.

In addition to the above described configurations, the sorbent material sheets may also have surface features. In some embodiments, the sorbent material sheets may include raised portions, and in other embodiments, the sorbent material sheets may include depressed portions. These surface features may be combined within the same sheet. The inclusion of raised and/or depressed portions in the sheets may be utilized to form various configurations between the sheets as they are stacked, wrapped, and so forth. For instance, the sheets can be aligned so that the raised and/or depressed portions nest with each other, which brings the adjacent sheets closer together. The sheets can also be aligned so that the raised and/or depressed portions do not nest with each other, which forms a gap between the adjacent sheets. The alignment can be used to form various channels for vapor adsorption between the sheets.

An activated carbon sheet>0.9 mm was pressed between a flat surface and a textured surface. This compression can be done during the manufacture of the sheet in the roll mill, with one smooth roll and one roll with grooves or indents machined into it. The mill and both rolls would have to be able to withstand the high hydraulic pressures to form the sheet in one step (for example chromed steel rolls). In some embodiments, the roll with grooves may be a roll with grooves integrally formed therein or may have a mold (or wrap) affixed thereto, such as a rubber mold, in which the grooves are formed. Regardless, the grooves form the negative of the pattern desired in the textured sorbent sheet. That is, a hill on the mold will create a valley in the textured sheet, and a valley in the mold will create a hill on the textured sheet.

The texture is chosen to achieve the desired properties, including, but not limited to void space.

Alternatively an activated carbon sheet can be manufactured thicker than needed, for example 1 mm, using the high pressure roller mill with two smooth rolls. Then this thicker sheet would be run through a second mill with one smooth roll and the other roll with grooves or indents machined into it. The second mill could also comprise two textured rolls. This second mill would not require as high a pressure since the sheet density and durability were achieved in the first mill. As a result the second mill can use a wrap around one of the rolls (made of rubber or polymer for example) that has the textured surface pattern. This simplifies the equipment required and reduces the expense of changing the texture pattern.

Alternatively the wrap (made of rubber or polymer for example) that has a textured surface pattern, can be stamped onto the thick sheet placed on a flat surface. This could be done manually on a flat table or in a calendaring unit.

In all three approaches, the overall average thickness of the sheet can be reduced through compression and in the process the texture pattern is added to one side of the sheet. The sheet thickness would vary with the hills and valleys of the texture pattern. Starting with a sheet thicker than required ensures the minimum thickness (in the valleys of the pattern) will still contain enough sheet to provide physical strength.

It was also noted during manufacture that in sheets where a "smooth" side was employed, some minimal texturing picked up from a roller, actually provided additional strength. Thus, in some embodiments, one side of the textured sheet is provided with the texture, in the sense that it creates hills and valleys to create pressure drop, and the other side is patterned such that the pattern adds strength to the sheet, without necessarily contributing significantly to pressure drop.

Sorbent Material Sheet Product

The textured sorbent material sheets described above are combined into a textured sorbent material sheet product. The combination of the textured sorbent material sheets takes advantage of one or more of the above described features, such as increased surface area/volume ratio, reduced void space, improved sorbent performance, etc. In general, the individual textured sorbent material sheets are arranged next to each other to form a textured sorbent material sheet product that comprises sheets that are stacked, rolled, wound, folded, and/or laminated such that the surfaces of the sorbent material sheets are in close proximity to, or adjacent to each other. Whatever the arrangement, the goal is to maximize the surface area of the sheets exposed to the vapor, fluid, and/or gas stream and thus the performance of the textured sorbent material sheets.

Stacked Textured sorbent material Sheet Product: The stacked textured sorbent material sheet product of the invention comprises two or more sorbent sheets each defining an upper surface and a lower surface, and having a known combined total surface area, wherein each sorbent sheet comprises a textured sorbent material and a binder; where adjacent sorbent sheets are stacked and arranged such that adjacent upper and lower surfaces are substantially congruent with each other, and aligned to allow fluid flow at least between adjacent upper and lower surfaces. Alternatively, two textured sheets, independently textured on one or both sides, can be separated by a smooth sheet. Any combination of textured and smooth sheets may be employed to achieve the desired effects.

Performance improvements of the stacked textured sorbent material sheet product of the invention can also be measured as the performance of the product having a given amount of activated carbon versus the performance of that same amount and grade of activated carbon if provided within a canister in a pelletized, granular, or powdered form. In some embodiments, the stacked sorbent sheet product has an ASTM BWC that is about 3% higher, about 5% higher, about 7% higher, about 9% higher, about 10% higher, about 12% higher, about 14% higher, and about 16% higher than the same amount and grade of activated carbon within a canister in pelletized or powdered form. Ranges based on these amounts are also contemplated, such as performance that is between about 5-14% higher, between about 5-10% higher, between about 10-16% higher, and so forth.

It should be noted that these improvements are only measured as between the volumes of the pelletized or powdered activated carbon and the stacked textured sorbent material sheet product, without accounting for other improvements of the stacked textured sorbent material sheet product. One key difference, described above, is the omission of a rigid canister body that would otherwise be required. The omission of the rigid canister body, which is needed in prior art systems involving pelletized or powdered activated carbon because the loose activated carbon cannot support itself, drives further weight savings and therefore even further performance for a given weight.

The stacked sorbent sheet product has an ASTM BWC at least 10% higher than the ASTM BWC of a pelletized/powdered form of the same amount by volume of the textured sorbent material in the sorbent sheet. The stacked sorbent sheet product has an ASTM BWC greater than about 10 g/100 mL. The stacked sorbent sheet product has an ASTM BWC of about 7.0 g/100 mL to about 30 g/100 mL, or greater than about 12 g/100 mL, or greater than about 13 g/100 mL, or greater than about 14 g/100 mL, or greater than about 15 g/100 mL, or greater than 20 g/100 mL. Ranges are also contemplated, such as about 10-20 g/mL, about 10-12 g/mL, about 10-14 g/mL, about 12-14 g/mL, about 12-15 g/mL, and about 15-20 g/mL.

In some embodiments, the stacked sheets are held in a spaced apart relationship which controls one or more of void volume, flow rate, pressure drop, and other characteristics. The spacing can also be achieved with various folds in the sheets, and can also be achieved by the corresponding raised and/or depressed portions of the sheets which are aligned to form gaps between the sheet. If the sheets are arranged deliberately so that the raised and/or depressed portions of the sheets do not nest between sheets, this results in additional spacing between the sheets and permits fluid flow in those portions. If the sheets are arranged deliberately so that at least some raised and/or depressed portions nest between sheets, this results in a tighter fitting stack of sheets and decreases the spacing between the sheets, with a corresponding decrease or even stop in fluid flow. Combinations of these features can be used to form stacked sorbent sheet products with directed regions or channels for fluid flow and barriers or edge seals to prevent fluid leakage. These features for fluid flow can also include holes, cuts, or apertures through one or more of the sheets in the stacked sorbent sheet product.

Each sorbent sheet defines opposed lateral edges which are substantially parallel to fluid flow. The congruent lateral edges of adjacent sorbent sheets may be separate from each other, bound together or some combination thereof. In this manner, the edges of the stacked textured sorbent material sheet product may be sealed, partially sealed, or unsealed. The sealed or unsealed nature can be chosen to achieve desired results such as modifying fluid flow rate and/or patterns or other properties.

In some embodiments, the stacked textured sorbent material product yields a void volume of about 10% or more. In some embodiments, the void volume is about 10% to 40%, others 15% to 30%.

In some instances, the textured sorbent material sheet product comprises at least two populations of textured sorbent material particles, wherein each of the at least two populations have different average particle diameters. See the above description of the bimodal particle size distribution which was discussed with respect to the individual textured sorbent material sheets. The same distribution ratios as between populations of sorbent particles are contemplated with respect to product formed of multiple textured sorbent material sheets. In some instances, the density of the textured sorbent material particles achieved by the at least two populations is greater than the density achieved by either population alone. The inclusion of a bimodal particle size distribution can also be used to improve the mechanical properties of the textured sorbent material sheet product because it makes the polymeric sheets more resistant to shear forces.

In some instances, a textured sorbent material sheet product comprises at least two textured sorbent material sheets, each of which has a defined upper surface and lower surface which have a combined total surface area, and wherein each textured sorbent material sheet comprises a textured sorbent material and a binder, and wherein each textured sorbent material sheet is stacked and arranged such that adjacent upper and lower surfaces of the separate sheets are substantially parallel and are aligned to allow fluid flow at least between the adjacent upper and lower surfaces.

The textured sorbent material sheet product, wherein the textured sorbent material sheet product has an ASTM BWC value about 5%, about 10%, about 15%, about 20%, about 25%, about 30%, about 35%, about 40%, about 45%, and about 50% higher than the ASTM BWC of the same volume of sorbent material in pelletized, granular, or powdered forms. These can also be combined to form ranges, for example, between about 5-25% higher. The invention also contemplates that these amounts are the endpoints on ranges, such as at least about 40% higher.

The textured sorbent material sheets in the textured sorbent material sheet product, may be configured as being flat, wound in a spiral cylinder, wound in an elliptical form, wound in an elongate rectangular bar, folded, laminated in an "S" shape, formed as concentric cylinders, formed as concentric ellipses, formed as a concentric rectangular bar, or as combinations of these forms.

In some embodiments, the textured sorbent material sheet product will comprise a single textured sorbent material sheet that is wound or rolled to achieve the desired characteristics including, but not limited to density, void space, pressure drop, etc.

Wound/Rolled Textured sorbent material Sheet Product: The textured sorbent material sheet product can also be wound or rolled as an alternative or in combination with stacked embodiments. A wound or rolled textured sorbent material sheet product comprises a sorbent sheet defining an upper surface and a lower surface, and combined has a known total surface area, wherein the sorbent sheet comprises a textured sorbent material and a binder where the sorbent sheet is spiral wound to create adjacent sheet layers which allow fluid flow around and between adjacent sheet layers.

Similar to the stacked sheet arrangement, the rolled sorbent sheet product has improved performance over the textured sorbent material sheets alone, and has improved performance over the equivalent volume of activated carbon that is provided in pelletized or powdered form.

Performance improvements of the rolled textured sorbent material sheet product of the invention can also be measured as the performance of the product having a given amount of activated carbon versus the performance of that same amount and grade of activated carbon if provided within a canister in a pelletized or powdered form. In some embodiments, the rolled sorbent sheet product has an ASTM BWC that is about 3% higher, about 5% higher, about 7% higher, about 9% higher, about 10% higher, about 12% higher, about 14% higher, and about 16% higher than the same amount and grade of activated carbon within a canister in pelletized or powdered form. Ranges based on these amounts are also contemplated, such as performance that is between about 5-14% higher, between about 5-10% higher, between about 10-16% higher, and so forth.

The rolled sorbent sheet product has an ASTM BWC at least 10% higher than the ASTM BWC of a pelletized/powdered form of the same amount by weight of the textured sorbent material in the sorbent sheet. The stacked sorbent sheet product has an ASTM BWC greater than about 10 g/100 mL. The stacked sorbent sheet product has an ASTM BWC of about 7.0 g/100 mL to about 30 g/100 mL, or greater than about 12 g/100 mL, or greater than about 13 g/100 mL, or greater than about 14 g/100 mL, or greater than about 15 g/100 mL, or greater than 20 g/100 mL. Ranges are also contemplated, such as about 10-20 g/mL, about 10-12 g/mL, about 10-14 g/mL, about 12-14 g/mL, about 12-15 g/mL, and about 15-20 g/mL.

A rolled sorbent sheet product as described herein has a generally cylindrical shape having a length substantially greater than its diameter, although any dimension can be employed, including conical, or frustro-conical variations, as well as ellipsoids, or other shapes.

The density of the rolled sorbent sheet product may be computed based on the formulas below:

Roll Density Calculations (US units)

$$\rho\left(\frac{lb}{ft^3}\right) = (3) \times \frac{BW \times L}{\left(\frac{OD^2}{4} - \frac{ID^2}{4}\right) \times n}$$

$BW$: Basis Weight $\left(\frac{oz}{yd^2}\right)$  $L$: Length on Roll (yd)

$OD$: Outer Roll Diameter (in)  $ID$: Inner Roll Diameter (in)

$W$: Machine width or roll length (in)  $\rho$: Roll Density $\left(\frac{lb}{ft^3}\right)$ Roll Density Calculations (SI units)

$$\rho\left(\frac{kg}{m^3}\right) = (1000) \times \frac{BW \times L}{\left(\frac{OD^2}{4} - \frac{ID^2}{4}\right) \times \pi}$$

$BW$: Basis Weight $\left(\frac{g}{m^2}\right)$  $L$: Length on Roll (m)

$OD$: Outer Roll Diameter (mm)  $ID$: Inner Roll Diamter/Core Diameter (mm)

$W$: Machine width or roll length (mm)  $\rho$: Roll Density $\left(\frac{kg}{m^3}\right)$ The rolled sorbent sheet product may be wound to an average roll density of about 80-1500 kg/m$^3$, about 500-2000 kg/m$^3$, about 750-1500 kg/m$^3$, about 900-1200 kg/m$^3$, about 900-1050 kg/m$^3$, about 400-500 kg/m$^3$, about 500-600 kg/m$^3$, about 500-550 kg/m$^3$, about 600-650 kg/m$^3$, about 650-700 kg/m$^3$, and about 700-750 kg/m$^3$.

The rolled sorbent sheet product has an ASTM BWC greater than about 10 g/100 mL. In some embodiments, the rolled sorbent sheet product has a BWC of about 7.0 g/100 mL to about 30 g/100 mL. The rolled sorbent sheet product may also have ASTM BWC that are the same as the above described sorbent sheet products which are not rolled.

Similar to the discussion above with respect to the stacked textured sorbent material sheets, the wound or rolled textured sorbent material sheets may include multiple particle size distributions or populations of the adsorbent pelletized or powdered activated carbon. The same ratios are contemplated as discussed above. Similar to the discussion above, this results in greater performance because it enables a larger amount of the activated carbon to be incorporated into the sheets which are formed into the rolled sorbent sheet product.

As used herein, wound or rolled sorbent sheet products refer to any form of layering of one or more textured sorbent material sheets by winding, spiral winding, concentric layering of tubular (of any cross-sectional shape, e.g. round, elliptical, square, triangular, rectangle, etc.) or combination thereof. For example, a single textured sorbent material sheet may be spiral wound along its length to form a cylindrical-shaped rolled textured sorbent material sheet product. As another example, a plurality of textured sorbent material sheets can be stacked and then wound together to form a similar cylindrical shape. As another alternative, several sheets each formed into a cylinder having a slightly different diameter from the next can be arranged such that they from concentric rings in cross-section of a similarly sized cylinder. Various combinations of these and other arrangements may be used to fill the space within any shape of housing or canister, as described elsewhere herein.

Figure 50:
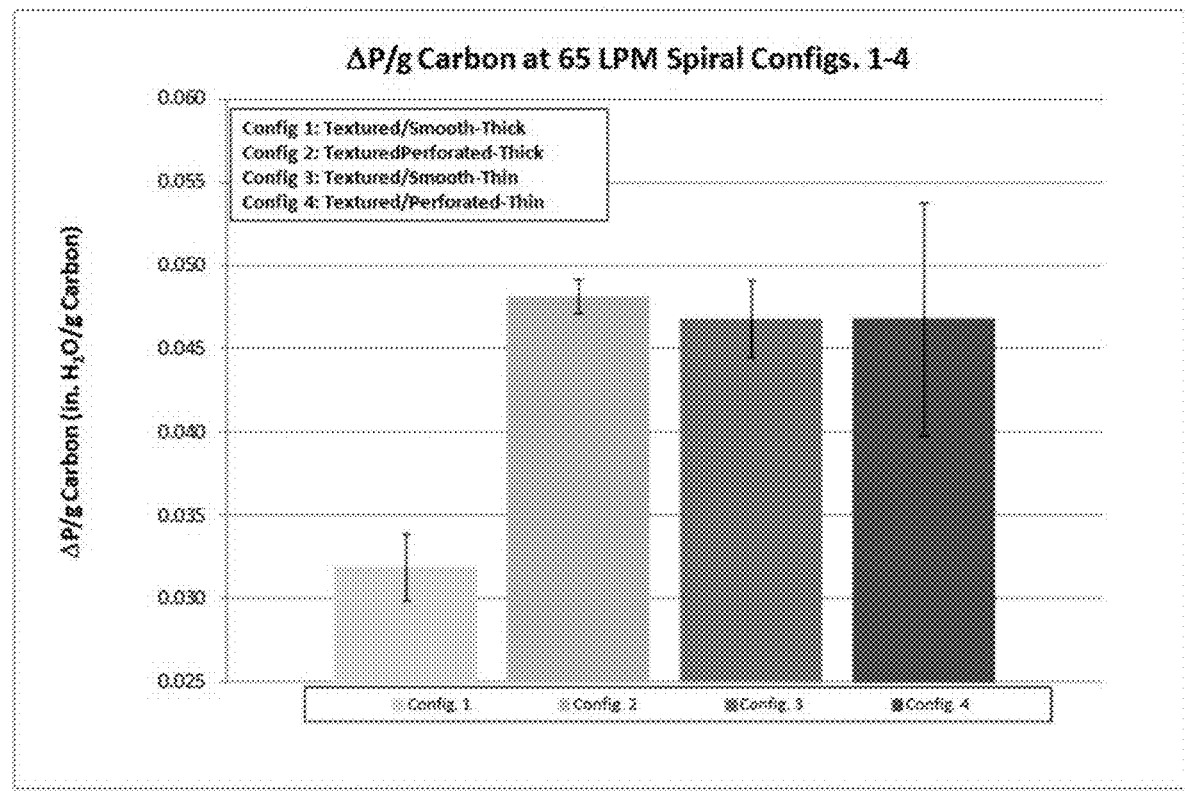
FIG. 50 is a graph depicting ΔP/g carbon at 65 LPM for certain embodiments disclosed herein.

Approaches to spiral windings were explored. Four spiral configurations were co-wound to a carbon mass of about 100 g and tested in 250 mL canisters. Each configuration included a 0.5 mm thick double-sided round-ribbed textured sheet, similar to that depicted in FIG. 26, co-wound with a second 0.5 mm or 1.0 mm sheet that was either smooth or perforated. Configuration 1 employed 0.5 mm textured sheet/1.0 mm smooth sheet, Configuration 2 employed 0.5 mm textured sheet/1.0 mm perforated sheet, Configuration 3 employed 0.5 mm textured sheet/0.5 mm smooth sheet, Configuration 4 employed 0.5 mm textured sheet/0.5 mm perforated sheet. As shown in the graph below, Configuration 1 provided the greatest margin with respect to ΔP at 30% less than the other configurations. Configuration 1 showed a ΔP of 3.4 inches of water, with a maximum target of 6.0 inches of water. Additional carbon was added to Configuration 1 at about 7.7% which resulted in a non-proportional increase of 75% to the limit of 6.0 inches of water. EPA BWC increased by 5.1% from 50.1 g/L to 52.6 g/L butane. See FIG. 50 for a graph depicting ΔP/g carbon at 65 LPM for these embodiments.

Use of the thick (1.0 mm)-smooth sheet of Configuration 1 appeared advantageous. The more rigid structure of the smooth-thick sheet may offer better resistance to compression when placed in the canister ΔP offers a good metric in terms of screening promising spiral designs, however increase in pressure drop may not be proportional with increases in carbon mass, which limits BWC gains.

Void Space Evaluation

Figure 51A:
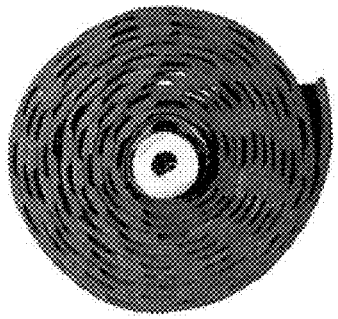
FIG. 51A is an image of a configurations of an embodiment disclosed herein.
Figure 51B:
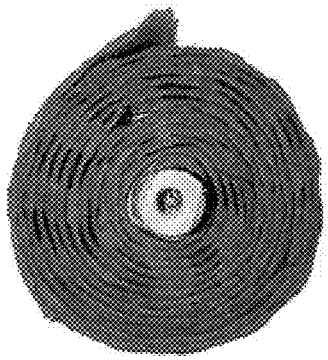
FIG. 51B is an image of a configurations of an embodiment disclosed herein.
Figure 51C:
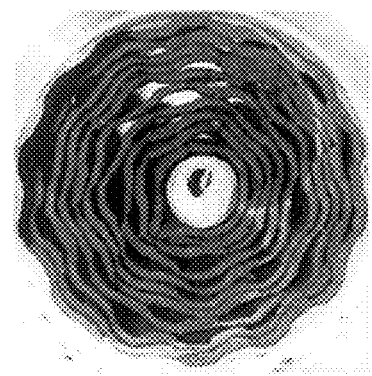
FIG. 51C is an image of a configurations of an embodiment disclosed herein.

Three single-sheet spiral configurations were wound at a carbon mass of 26 g using 1.0 mm thick sheet. Volume was 0.07 L for screening purposes. Configuration A: Inward Facing Texture Wind, Configuration B: Outward Facing Texture Wind, Configuration C: Double Sided Texturing. 100 g of tension was applied during the winding process. Configurations A and C had the lowest ΔP/g. Using the EPA BWC test method, Configuration A had 12% more BWC vs. Configuration C. The voids of Configuration B appear stretched/flattened with the outward wind. See FIGS. 51A, 51B, and 51C images of these configurations.

Figure 52:
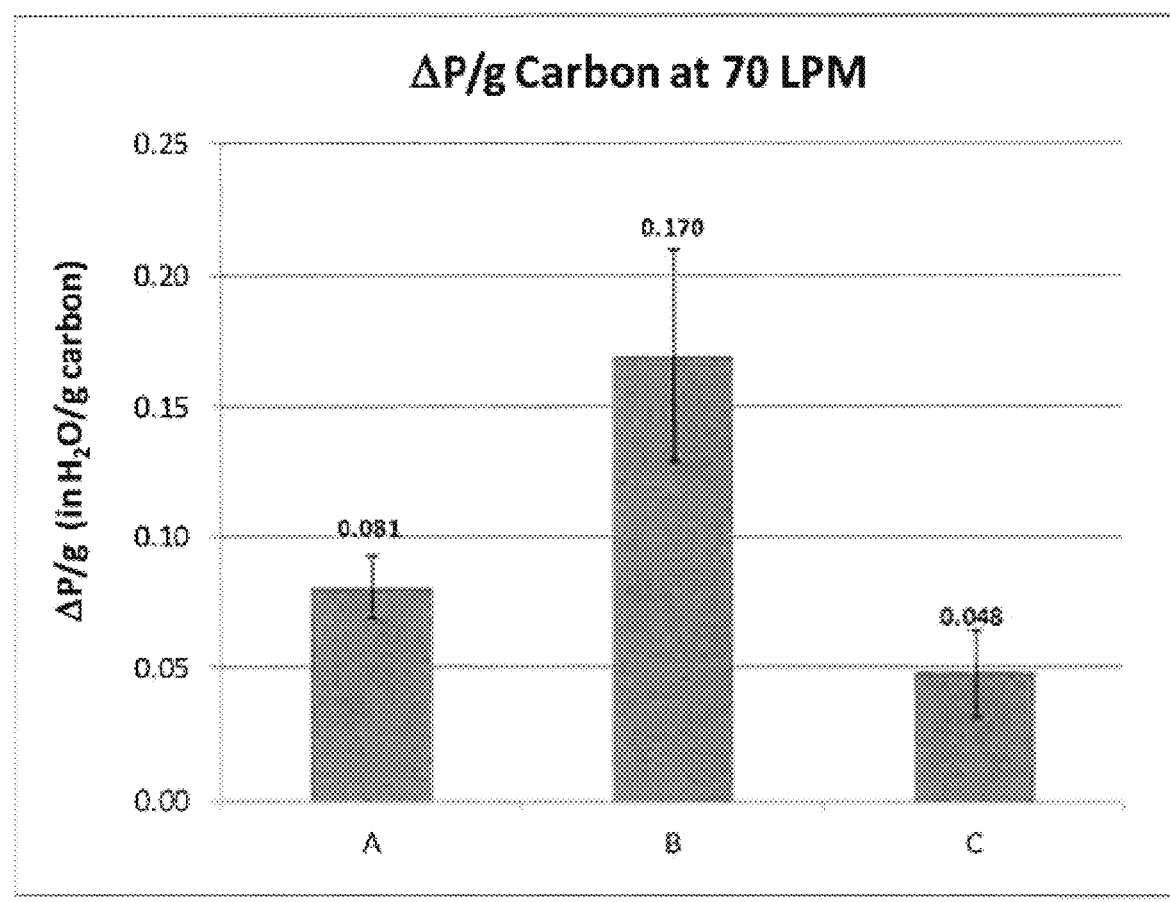
FIG. 52 is a graph depicting ΔP/g carbon at 70 LPM for certain embodiments disclosed herein.

Through analysis of photographs, we can see Configuration A has more consistent openings and shape of the texture is maintained, Configuration B openings appear to collapse closer to center core, and Configuration C textures are more open, but appear to be inconsistently distributed. See FIG. 52 for a graph depicting ΔP/g carbon at 70 LPM for certain embodiments disclosed herein.

The images above were analyzed to determine the amount of void space present (based on pixel color).
Results:

TABLE 1

Configuration A

Configuration A, Sample 3460-50-8

| Flow (LPM) | ΔP w/Canister (in H$_2$O) | ΔP w/o Canister (in H$_2$O) | ΔP on per gram basis (in H$_2$0) |
|---|---|---|---|
| 10 | 0.360 | 0.270 | 0.030 |
| 30 | 1.100 | 0.760 | 0.029 |
| 50 | 2.200 | 1.440 | 0.055 |
| 70 | 3.500 | 2.200 | 0.084 |
| Sprial and Core (g) | 30.26 | | |
| Core (g) | 4.21 | | |
| Mass Carbon (g) | 26.05 | | |

TABLE 1A

Configuration A (Table 1 - converted to SI units)
Configuration A, Sample 3460-50-8

| Flow (LPM) | ΔP w/Canister (kPa) | ΔP w/o Canister (kPa) | ΔP on per gram basis (kPa) |
|---|---|---|---|
| 10 | 0.090 | 0.067 | 0.002 |
| 30 | 0.274 | 0.189 | 0.007 |
| 50 | 0.548 | 0.359 | 0.014 |
| 70 | 0.872 | 0.548 | 0.021 |
| Spiral and Core (g) | 30.26 | | |
| Core (g) | 4.21 | | |
| Mass Carbon (g) | 26.05 | | |

TABLE 2

Configuration B

Configuration B, Sample 3460-50-14

| Flow (LPM) | ΔP w/Canister (in H$_2$O) | ΔP w/o Canister (in H$_2$O) | ΔP on per gram basis (in H$_2$0) |
|---|---|---|---|
| 10 | 0.320 | 0.230 | 0.009 |
| 30 | 1.200 | 0.860 | 0.033 |
| 50 | 2.300 | 1.540 | 0.059 |
| 70 | 5.600 | 4.300 | 0.163 |
| Sprial and Core (g) | 30.50 | | |
| Core (g) | 4.20 | | |
| Mass Carbon (g) | 26.30 | | |

TABLE 2A

Configuration B (Table 2 - converted to SI units)
Configuration B, Sample 3460-50-14

| Flow (LPM) | ΔP w/Canister (kPa) | ΔP w/o Canister (kPa) | ΔP on per gram basis (kPa) |
|---|---|---|---|
| 10 | 0.080 | 0.057 | 0.002 |
| 30 | 0.299 | 0.214 | 0.008 |

TABLE 2A-continued

Configuration B (Table 2 - converted to SI units)
Configuration B, Sample 3460-50-14

| Flow (LPM) | ΔP w/Canister (kPa) | ΔP w/o Canister (kPa) | ΔP on per gram basis (kPa) |
|---|---|---|---|
| 50 | 0.573 | 0.384 | 0.015 |
| 70 | 1.395 | 1.071 | 0.041 |
| Spiral and Core (g) | 30.50 | | |
| Core (g) | 4.20 | | |
| Mass Carbon (g) | 26.30 | | |

TABLE 3

Configuration C

Configuration C, Sample 3460-50-7

| Flow (LPM) | ΔP w/Canister (in H$_2$O) | ΔP w/o Canister (in H$_2$O) | ΔP on per gram basis (in H$_2$O) |
|---|---|---|---|
| 10 | 0.180 | 0.090 | 0.004 |
| 30 | 0.610 | 0.270 | 0.011 |
| 50 | 1.300 | 0.540 | 0.021 |
| 70 | 2.100 | 0.800 | 0.031 |
| Sprial and Core | 29.95 | | |
| Core | 4.37 | | |
| Mass Carbon | 25.58 | | |

TABLE 3A

Configuration C (Table 3 - converted to SI units)
Configuration C, Sample 3460-50-14

| Flow (LPM) | ΔP w/Canister (kPa) | ΔP w/o Canister (kPa) | ΔP on per gram basis (kPa) |
|---|---|---|---|
| 10 | 0.045 | 0.022 | 0.001 |
| 30 | 0.152 | 0.067 | 0.003 |
| 50 | 0.324 | 0.135 | 0.005 |
| 70 | 0.523 | 0.199 | 0.008 |
| Spiral and Core (g) | 30.50 | | |
| Core (g) | 4.20 | | |
| Mass Carbon (g) | 26.30 | | |

TABLE 4

Summary of results

| Configuration | Void % | Carbon Mass | ΔP w/Canister (in H$_2$0) at 10 Lpm | ΔP w/Canister (in H$_2$0) at 30 Lpm | ΔP w/Canister (in H$_2$0) at 50 Lpm | ΔP w/Canister (in H$_2$0) at 70 Lpm |
|---|---|---|---|---|---|---|
| A | 21% | 26.05 | 0.360 | 1.100 | 2.200 | 3.500 |
| B | 18% | 26.3 | 0.320 | 1.200 | 2.300 | 5.600 |
| C | 35% | 25.58 | 0.180 | 0.610 | 1.300 | 2.100 |

Configurations A and C were further tested in 250 mL canisters, with EPA BWC values obtained of 55 g/L and 51 g/L respectively, showing the benefit of the A configuration.

TABLE 4A

Summary of Results (Table 4 - converted to SI units)

| Config- uration | Void % | Carbon Mass (g) | ΔP w/Canister (kPa) at 10 LPM | ΔP w/Canister (kPa) at 30 LPM | ΔP w/Canister (kPa) at 50 LPM | ΔP w/Canister (kPa) at 70 LPM |
|---|---|---|---|---|---|---|
| A | 21 | 26.05 | 0.090 | 0.274 | 0.548 | 0.872 |
| B | 18 | 26.3 | 0.080 | 0.299 | 0.573 | 1.395 |
| C | 35 | 25.58 | 0.045 | 0.152 | 0.324 | 0.523 |

Configurations A and C were further tested in 250 mL canisters, with EPA BWC values obtained of 55 g/L and 51 g/L respectively, showing the benefit of the A configuration.

Conclusions:

Pressure drop of spirals is dependent on void space. More void space yields lower pressure drop. Less void space yields higher pressure drop. Thus, the void space can be controlled by manipulating the size of the hills and valleys of the textured sorbent sheets as well as the spiral winding characteristics.

The Housing

The invention also contemplates the use of a housing which partially or totally encapsulates the textured sorbent material sheets. The housing may be configured in a variety of shapes, for example tetrahedrons, cubes and cuboidal shapes, cylinders, spheres, hyperboloids of a single sheet, conical shapes, ellipsoidal shapes, rectangular shapes, hyperbolic paraboloid shapes, elongate bar shapes, paraboloids, and combinations of these shapes. The combinations may be selected to have different sections each of which have different shapes or portions of different shapes. The housing may also include sections which are separated and are connected by an additional part, for instance, at least one hose or tube which is designed to transfer fuel vapors as needed, or a thin portion of housing that contains the textured sorbent material sheets. The housing may also be configured with no shape, for example as a flexible bag or pouch containing the textured sorbent material sheets.

One major advantage of the invention is that the textured sorbent material sheets are both flexible and self-supporting and can be laminated, rolled, wound, folded, or stacked in a variety of configurations within the housing to suit different mechanical requirements within the tight confines of a vehicle. In such embodiments, the housing would be designed to conform or fit the spaces that are available for the device to be stored. For instance, the housing can be sized and shaped to fit in spaces within or surrounding wheel wells, driveshafts, batteries for hybrid powertrains, spare tires, tire changing tools, tire patching tools, vehicle trunks or other storage spaces, vehicle bumpers and bodywork panels, exhaust systems, other emissions control equipment such as urea or other injection tanks, fuel lines, vehicle frames, suspension components, engine compartment, under passenger compartment seats, within passenger compartment seats, and other spaces which are too small or too difficult to reach to be effectively utilized for passenger or cargo space.

To further reduce weight and size and take advantage of the self-supporting textured sorbent material sheets, the housing can be in the form of a thin walled bag or pouch. This is possible because the textured sorbent material sheets have some mechanical structure and are self-supporting and so do not require a rigid outer container as in conventional canisters. The film materials that form the bag can have thicknesses of about 10 μm to about 250 μm. In other embodiments, the bag film can have thicknesses of about 20 μm to about 175 μm, and the bag film can have thicknesses of about 50 μm to about 125 μm.

The bag or pouch may be formed of any materials which are used in fuel systems, and particularly are formed of materials which are designed to withstand the chemical effects of the fuel vapors contained. Bag materials include polytetrafluoroethylenes (PTFE or TEFLON), polyvinylidene fluorides (PVF2 or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. The bag is typically thermoplastic for flexibility, but can also be a combination with amounts of thermoset or can be in the form of a cured rubber or an elastomer.

The housing, bag, or pouch may also be designed to act as a vapor barrier to the adsorbed fuel vapors contained therein. This barrier property may be inherent to the polymer itself, or may be achieved through the use of at least one barrier additive and/or at least one barrier layer. Examples of barrier additives which can be formed as a layer or as a particulate filler include polymers such as epoxy, polyamide, polyamide imides, fluoropolymers, fluororubbers, and combinations of those. Barrier layers can also be made of metals such as aluminum, steel, titanium, and alloys of those. The metal barrier layers can be formed by conventional mechanical means, such as coextrusion or adhering with the other layers of the housing, or they can be chemically deposited, such as by chemical vapor deposition or electroplating. The metal barrier layer can be formed from a foil having a thickness of less than about 25 μm, less than about 20 μm, less than about 15 μm, less than about 10 μm, or less than about 5 μm.

The housing and its materials may also be selected to be compatible with "ship in a bottle" fuel systems. In such systems, many or all of the fuel system components, including the fuel pumps, ORVR, fuel filters, valves, and other components are fitted within the vehicle fuel tank. Such systems are advantageous because they reduce assembly time and the amount of space required by the fuel system. In such systems, the housing should have materials which are capable of being immersed in the selected fuel, typically gasoline, for extended periods of time within the vehicle fuel tank, while also being able to withstand the effects of the adsorbed fuel vapors within.

The housing may also be a thin metal housing. The thin metal housing can be formed of flexible or rigid metals such as steel, aluminum, titanium, and alloys of those. The metal housing can be formed from a foil having a thickness of about 5-100 μm, or about 10-250 μm. In some embodiments, the foil may be as thick as about 1 mm Whether the housing is flexible or rigid depends on the selection of the material, the thickness, and any treatments that have been applied to the metals, such as heat treatments or hot or cold working.

In some embodiments, the housing for the textured sorbent material sheets may be omitted entirely, with the textured sorbent material sheets being contained within the fuel tank itself. In such configurations, the textured sorbent materials sheets can be attached to a portion of the interior of the fuel tank that does not regularly come in contact with liquid fuel and which is free to adsorb fuel vapors. This portion is typically the top or sides of the fuel tank, or combinations of those. The fuel tank may also include a recessed portion on the top or the sides which is designed to include the textured sorbent material sheets and allow the textured sorbent material sheets to adsorb fuel vapors. Such embodiments where textured sorbent material sheets are attached to the interior portions of the fuel tank not only offer maximum space savings and weight savings by omitting the canister structure, but also simplify manufacturing and installation because the sheets are already installed within the fuel tank during vehicle assembly.

The housing can also be eliminated by forming a rolled or folded sorbent sheet and then selectively curing the outer sheets so that they form a durable, cured shell that acts as a support for the rolled or folded sorbent sheets within. Such selective curing can be accomplished thermally or with a chemical bath, or via actinic radiation, such as ultraviolet light or by electron beam curing.

In embodiments where the textured sorbent material sheets omit the housing and are contained within the vehicle fuel tank itself, the textured sorbent material sheets may be attached to the fuel tank in a variety of ways. The textured sorbent material sheets can be fastened using mechanical fasteners such as screws, rivets, or clamps, or the textured sorbent material sheets may be fastened using an adhesive backing positioned between the fuel tank wall and the textured sorbent material sheets. The adhesive backing may be a single layer of adhesive or a double sided adhesive tape or sheet. The adhesive used in the adhesive backing may include pressure sensitive adhesives, UV curing adhesives, thermally curing adhesives, hot melt adhesives, and reactive multi-part adhesives. Adhesive compositions include acrylic and (meth)acrylic, acrylate and (meth)acrylate, epoxies in one- and two-part formulations, and urethane.

The textured sorbent material sheets may be applied during manufacturing in a variety of ways. In some embodiments, the fuel tank may be formed and the textured sorbent material sheets are applied in a separate step where the adhesive is applied followed by the application of the textured sorbent material sheets. In other embodiments, the textured sorbent material sheets are placed, with or without an adhesive backing as appropriate, on the inside of a mold and the fuel tank is injected or blow molded around the textured sorbent material sheets. In other embodiments, the textured sorbent material sheets may be coextruded with panels of material which make up the sides of the fuel tank, and the edges of those panels are adhered or welded together to seal the final tank with the textured sorbent material sheets on the inside.

When the textured sorbent material sheets are contained within the vehicle fuel tank without the housing, the fuel tank may include additional valves and ports to accommodate the adsorption and desorption of fuel vapors in the fuel tank. For example, during engine operation, air may be introduced into the fuel tank to desorb the fuel vapors which are contained in the textured sorbent material sheets, as well as those which are present in the tank. These desorbed fuel vapors are then sent to the engine for combustion during optimal cycles as required by the Engine Control Unit (ECU).

When the textured sorbent material sheets are provided without a housing and are contained within a tank, such as a vehicle fuel tank, they may be positioned so that they are not regularly immersed in the volatile liquids typically contained within the tank. This ensures that the textured sorbent material sheets do not become prematurely saturated, and also ensures that sufficient surface area is exposed to the vapors within the fuel tank to effect the adsorption of the vapors. The feature contemplates that the textured sorbent material sheets can be placed in parts of the tank that are unfilled, such as the ullage or headspace of the tank, or near baffles which prevent the sloshing of liquids on the textured sorbent material sheets. The textured sorbent material sheets may also be places in a dedicated portion of the tank, such as a small chamber or niche, where the liquids cannot enter.

The devices of various embodiments may include a housing and the textured sorbent material sheets described above. The housing may be any shape and can be configured for purifying gasses or liquids. For example, in some embodiments, the housing may be any shape such as, for example, cuboidal, cubic, or cylindrical. The textured sorbent material sheets may be sized to fit within the housing and substantially fill a space within the housing through which the gas or liquid is passed. In some embodiments, two or more textured sorbent material sheets may be stacked to substantially fill the housing, and in other embodiments, the textured sorbent material sheets may be rolled to form a spiral wound sheet or pressed to form a stacked sheet. In some embodiments, the stacked or pressed sheets may be such that the sides of adjoining sheets are substantially contiguous. In other embodiments, stacked or pressed sheets may be positioned such that adjoining sheets are spaced. For example, in certain embodiments, the sheets may be corrugated, having textured sorbent material sheets that form a series or parallel ridges and furrows, and in some embodiments, corrugated textured sorbent material sheets may be separated by flat textured sorbent material sheets. The corrugated textured sorbent material sheets may be disposed within the housing in a stacked or rolled/spiral wound form.

In various embodiments, the void fraction may be about 30% to about 32% less than the void volume for current devices, and in some embodiments, the void fraction may be as low as 10%. For example, the devices may have a void fraction of about 45% to about 10%, about 35% to about 10%, about 25% to about 10%, or any individual void fraction or range encompassed by these example ranges. The devices of various embodiments may exhibit less flow restriction, e.g. pressure drop, than devices having granular or pelleted textured sorbent materials. Thus, more textured sorbent material can be incorporated into such devices without reducing the flow rate of the device.

The devices of such embodiments may have an EPA BWC of greater than about 5.0 g/100 mL, and in some embodiments, the devices may have an EPA BWC of about 4.0 g/100 mL to about 20 g/100 mL, 5.0 g/100 mL to about 18 g/100 mL, about 7.0 g/100 mL to about 16 g/100 mL, or about 8.0 g/100 mL to about 15 g/100 mL, or any individual BWC or range encompassed by these example ranges. The devices may exhibit a pressure drop that is at most equal to a conventional dense pack bed of powders, pellets, or granules of activated carbon or other activated compounds. This feature is advantageous because it ensures that the textured sorbent material sheet product, whether stacked, rolled, wound, or otherwise configured, still has the same ability to process and transfer vapors and gases as conventional devices, despite the increased sorbent performance.

When the textured sorbent material product, stacked or rolled, is combined with a housing, it is useful as a vapor loss canister or other device. As noted above, the shapes and properties achieved via the stacked or rolled products allow for unique placement and improved performance.

In accordance with some embodiments, a vapor loss canister comprises a housing having at least one sidewall defining an internal space, a sorbent sheet product, such that the sorbent sheet media is sized and configured to fit within the housing and fill substantially the entire internal space within the housing, wherein the internal space is substantially free of additional internal material other than the sorbent sheet media. That is, traditional vapor loss canisters require springs, filters, support substrates, etc. to hold and maintain the loose carbon powder or pellets. Because the sorbent sheets are substantially self-supporting, these additional support structures are not needed. This allows for the inclusion of more material or the use of a smaller canister without sacrificing performance.

In some embodiments, the sorbent sheet product comprises a stacked sorbent sheet media comprising as described above. In such instances, the housing or canister can take any shape as discussed above, but in some embodiments, is relatively flat and flexible for housing stacked sorbent sheet media that has a height substantially less than its length or width. In these instances, the housing may be a flexible bag or pouch, as discussed above.

In some instances the canister is adapted for placement atop or even within a fuel tank.

In some embodiments, sorbent sheet material product comprises a rolled sorbent sheet product as described above. In some instances, at least a portion of the housing sidewall defines a filter substantially without occupying any internal canister space.

In some embodiments, a fuel tank may be provided with integral vapor adsorption. Such tanks comprise a tank structure, and at least one sorbent sheet material product, either stacked or rolled, at least one fastening device which fastens the textured sorbent material product to a surface of the tank that is not regularly immersed in the volatile liquids contained within the tank. The fastening device may be an adhesive layer which is formed between one surface of the textured sorbent material product and a wall of the tank.

Such adhesive may be at least one of pressure sensitive adhesives, UV curing adhesives, thermally curing adhesives, hot melt adhesives, reactive multi-part adhesives, acrylic and (meth)acrylic adhesives, acrylate and (meth)acrylate adhesives, epoxies adhesives in one- and two-part formulations, urethane adhesives, and copolymers and combinations thereof.

The tank may further include one or more of at least one fuel pump(s), fuel sending line(s), fuel return line(s), atmospheric vent line, port(s), valve(s), sensor(s), air inlet(s), open cell foam, baffle(s), bladder(s) and combinations of those.

In some embodiments, the tank is a fuel tank with a "ship in a bottle" configuration.

Some embodiments provide an onboard refueling vapor recovery (ORVR) apparatus comprising the textured sorbent material sheet product as described herein. The onboard refueling vapor recovery apparatus may include a vapor adsorbing canister as described herein. The onboard refueling vapor recovery apparatus may include a tank with integral vapor adsorption.

Additional Components

The invention may include sensors such as a fuel composition sensor. The fuel composition sensor may be used to detect the mixture of gasoline and ethanol contained within the housing and the textured sorbent material, and this information may be communicated to the ECU so that vapors which are later released to the engine can be more precisely used during engine combustion. Other sensors include temperature sensors, vapor pressure sensors, oxygen sensors, and the like. The sensors can operate on principles of electrochemical interaction, electronic such as thermocouples, electromechanical, refractive index, infrared spectroscopy, and others depending on the type of information that is required for the ECU. The sensors can be included alone or in combination within the housing, or, if no housing is specified, within the area that contains the textured sorbent materials sheets. The sensors can be included in holes or notches which are cut from the sheet, or in spaces between the sheets with the sheets wrapped or folded around the sensors.

The invention may include inlets, outlets, hoses, and associated valves to control the flow of fuel vapor to and from the textured sorbent materials of the invention. The openings may be static or they may have valves that are opened and closed as required by the ECU to control the flow of vapor into and out of the sorbent sheets of the invention. For example, during refueling, outlet valves remain closed to ensure that displaced fuel vapors do not escape into the atmosphere. However, when the engine operates and the ECU requests it, at least one outlet valve may open to allow the release of adsorbed vapor into the engine to allow its combustion. There may also be included a vent and valve to the atmosphere in case there is too much fuel vapor for the textured sorbent material sheets of the invention to safely adsorb. There may further be included an inlet and valve for air or other gases, such as inert exhaust gases, which is used to desorb the fuel vapor as it is being sent to the engine for combustion.

The invention also contemplates the inclusion of and integration with other components which make up ORVR systems and devices. These other components may include active compressors and condensers, fuel tank heaters, fuel tank heat exchanging coils for cooling enclosed fuels, fuel filler necks, fuel filler ports, including capless fuel filler ports, vents for fuel vapors, fuel lines for sending fuel, fuel return lines, vents and vehicle rollover valves, fuel pumps, and air intake or purge valves.

The invention further contemplates devices and structures which may be combined with the textured sorbent material sheets to improve or control the adsorption and desorption of fluids and gases. For example, fans or pumps may be included to force the fluids or vapors over the textured sorbent material sheets as they are assembled, allowing the textured sorbent material sheets to be packed or wound tighter or allowing larger devices than would otherwise be possible with the same amount of fluid diffusion over the sheets. Alternatively, the devices can include resistance element heaters, or Peltier effect heaters or coolers which are designed to heat and/or cool the fluids and thus force their movement over the textured sorbent material sheets of the claimed invention. For instance, heated, expanding fluid may vent upwards and draw in more fluid at the bottom of a rolled or wound article that is oriented vertically to take advantage of the effects of gravity.

Other Uses

In addition to automotive uses, the inventors contemplate that the sorbent sheets of the claimed invention can be used in any instance where a tank or other enclosed space is designed to contain volatile liquids, in particular volatile hydrocarbons such as fuels, solvents, and other volatile compounds. Examples include but are not limited to fuel tanks in aircraft, fuel tanks in ships and other marine vehicles, fuel tanks in trucks, chemical tanks in railroad cars, barges, ships, trucks, vehicles, and other bulk carriers, and stationary chemical tanks. The textured sorbent material sheets of the claimed invention can also be attached or adhered to the walls of confined spaces where the presence of volatile compounds would be detrimental, for example, in chemical facilities where operators and maintenance staff must periodically access the space. Such textured sorbent material sheets, when used in such combined spaces, can not only increase safety for operators and maintenance staff, but they can also reduce the need for cumbersome protective gear.

In some embodiments, the devices may not filter microscopic particles, and therefore will have utility outside the fuel vapor recovery arena. Devices containing granular or pelleted textured sorbent materials filter particles that are larger than about 1% of their diameter thereby removing these particles from gases or liquids that are treated using the device. Because devices containing stacked or rolled/spiral wound textured sorbent material sheets allow such particles to pass through without filtering, the devices of various embodiments may be useful for filtering liquids. Particularly, such textured sorbent material sheets may be useful for filtering biological fluids such as blood, where red and white blood cells and platelets and the like must pass through the filter without being physically filtered out of the blood. Other contaminants may be adsorbed onto the textured sorbent material sheets and removed from the blood filtrate.

What is claimed is:

1. A textured sorbent material sheet, comprising:
   an activated carbon sorbent material and a binder, the textured sorbent material sheet defining an upper surface and a lower surface wherein one of the upper surface and the lower surface comprises a texture defined by a series of hills and valleys and formed by compression, and a different one of the upper surface and the lower surface comprises a pattern,
   wherein the texture comprises one of a diamond texture, a triangular texture, or a dimpled texture,
   wherein the textured sorbent material sheet has an ASTM BWC of about 7 g/100 mL to about 30 g/100 mL, and
   wherein a depth of the pattern is less than a depth of the texture.

2. The textured sorbent material sheet of claim 1, wherein the textured sorbent material sheet has a thickness measured at a valley of about 0.1 mm to about 1.0 mm.

3. The textured sorbent material sheet of claim 1, wherein the textured sorbent material sheet has a thickness measured at a hill or peak of about 1.0 to about 1.5 mm.

4. The textured sorbent material sheet of claim 1, wherein the distance from a tip of a hill to the bottom of a valley is about 1.0 mm to about 0.1 mm.

5. The textured sorbent material sheet according to claim 1, wherein the hills are defined as uncompressed portions and the valleys are defined as compressed portions.

6. A textured sorbent material sheet product, comprising:
   at least two textured sorbent material sheets in accordance with claim 1, and
   wherein each textured sorbent material sheet is stacked and arranged such that adjacent upper and lower surfaces of the separate sheets are substantially parallel and are aligned to allow fluid flow at least between the adjacent upper and lower surfaces.

7. The textured sorbent material sheet product of claim 6, wherein at least one of the textured sorbent material sheets are configured as being flat, wound in a spiral cylinder, wound in an elliptical form, wound in an elongate rectangular bar, folded, laminated in an "S" shape, formed as concentric cylinders, formed as concentric ellipses, formed as a concentric rectangular bar, or as combinations of these forms.

8. The textured sorbent material sheet product of claim 6, wherein the hills and valleys portions are present on adjacent sheets and are nested.

9. The textured sorbent material sheet product of claim 6, wherein the hills and valleys portions are present on adjacent sheets and are not nested.

10. A rolled textured sorbent material sheet product, comprising:
    a textured sorbent material sheet according to claim 1,
    wherein the textured sorbent material sheet is spiral wound to form adjacent sheet layers which allow fluid flow around and between adjacent sheet layers.

11. The rolled textured sorbent material sheet product of claim 10, wherein the rolled textured sorbent material sheet product has a generally cylindrical shape having a length that is greater than its diameter.

12. A vapor adsorbing canister, comprising:
    the textured sorbent material sheet product of claim 8, and
    a housing at least partially encapsulating the textured sorbent material sheet product.

13. The vapor adsorbing canister of claim 12, wherein the housing is flexible.

14. A vapor adsorbing canister, comprising,
    a rolled textured sorbent material sheet product according to claim 10, and
    a housing at least partially encapsulating the rolled textured sorbent material sheet product.

15. A tank with integral vapor adsorption, comprising: a tank structure, and
    at least one textured sorbent material sheet, wherein the textured sorbent material sheet comprises an activated carbon sorbent material and a binder, the textured sorbent material sheet defining an upper surface and a lower surface wherein at least one of the upper surface and the lower surface comprises a texture defined by a series of hills and valleys, and
    at least one fastening device which fastens the textured sorbent material sheet to a surface of the tank that is not regularly immersed in volatile liquids contained within the tank.

16. The tank with integral vapor adsorption of claim 15, wherein the fastening device is an adhesive layer which is formed between one surface of the textured sorbent material sheet and a wall of the tank.

17. An onboard refueling vapor recovery apparatus comprising the textured sorbent material sheet of claim 1.

18. An onboard refueling vapor recovery apparatus comprising the rolled textured sorbent material sheet product of claim 10.

19. An onboard refueling vapor recovery apparatus comprising the vapor adsorbing canister of claim 14.

* * * * *